(12) United States Patent
Pierce et al.

(10) Patent No.: US 10,749,986 B2
(45) Date of Patent: Aug. 18, 2020

(54) PLATFORM FOR INTERACTION VIA COMMANDS AND ENTITIES

(71) Applicant: Samsung Electronics Co., Ltd., Gyeonggi-do (KR)

(72) Inventors: Jeffrey S. Pierce, Sunnyvale, CA (US); Mike Digman, Mountain View, CA (US); Ranhee Chung, San Francisco, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 306 days.

(21) Appl. No.: 15/481,701

(22) Filed: Apr. 7, 2017

(65) Prior Publication Data
US 2017/0295260 A1    Oct. 12, 2017

Related U.S. Application Data

(60) Provisional application No. 62/320,911, filed on Apr. 11, 2016.

(51) Int. Cl.
*H04L 29/08* (2006.01)
*G06F 16/2452* (2019.01)
(Continued)

(52) U.S. Cl.
CPC ............... *H04L 67/34* (2013.01); *G06F 8/34* (2013.01); *G06F 8/36* (2013.01); *G06F 9/445* (2013.01);
(Continued)

(58) Field of Classification Search
CPC ... H04L 67/34; H04L 67/125; H04L 67/2823; H04L 69/329; H04L 67/10;
(Continued)

(56) References Cited

U.S. PATENT DOCUMENTS

| 6,598,134 B2 | 7/2003 | Ofek et al. |
| 8,341,318 B2 | 12/2012 | Holden et al. |

(Continued)

FOREIGN PATENT DOCUMENTS

| KR | 20170116590 A | 10/2017 |
| WO | 2014100414 A1 | 6/2014 |
| WO | 2017179876 A1 | 10/2017 |

OTHER PUBLICATIONS

"Workflow," [online] DeskConnect, Inc. © 2017 [retrieved Apr. 7, 2017], retrieved from the Internet: <https://www.workflow.is/>, 5 pg.

(Continued)

*Primary Examiner* — Jennifer N To
*Assistant Examiner* — Eric J Yoon
(74) *Attorney, Agent, or Firm* — Cuenot, Forsythe & Kim, LLC

(57) ABSTRACT

Interacting with a computing device can include registering a plurality of commands from a plurality of applications, wherein the plurality of commands specify entity types that are accepted as parameters, determining a first entity having a first entity type, wherein the first entity is independent of the plurality of applications, and determining a selected command from the plurality of commands registered by the plurality of applications that accepts the first entity type as a parameter. The first entity and the selected command can be provided, using a processor, to a first application of the plurality of applications that supports the selected command for execution.

21 Claims, 9 Drawing Sheets

(51) Int. Cl.
| | |
|---|---|
| *G06F 16/2453* | (2019.01) |
| *G06F 8/36* | (2018.01) |
| *G06Q 30/00* | (2012.01) |
| *G06F 8/34* | (2018.01) |
| *G06Q 50/00* | (2012.01) |
| *G06F 9/445* | (2018.01) |

(52) U.S. Cl.
CPC .. *G06F 16/24526* (2019.01); *G06F 16/24547* (2019.01); *G06Q 30/00* (2013.01); *G06Q 50/00* (2013.01); *H04L 67/125* (2013.01); *H04L 67/2823* (2013.01); *H04L 69/329* (2013.01)

(58) Field of Classification Search
CPC ......... G06F 16/24547; G06F 16/24526; G06F 8/34; G06F 8/36; G06F 9/445; G06F 9/4843; G06Q 30/00
See application file for complete search history.

(56) References Cited

U.S. PATENT DOCUMENTS

| | | | |
|---|---|---|---|
| 8,369,217 B2 | 2/2013 | Bostica et al. | |
| 8,554,924 B2 | 10/2013 | Holden et al. | |
| 8,639,733 B2 | 1/2014 | Holden et al. | |
| 9,026,637 B2 | 5/2015 | Lopez | |
| 9,342,470 B2 | 5/2016 | Bryant-Rich et al. | |
| 2002/0147859 A1 | 10/2002 | Navoni et al. | |
| 2006/0168347 A1 | 7/2006 | Martin | |
| 2008/0059195 A1 | 3/2008 | Brown | |
| 2008/0222611 A1* | 9/2008 | Sharma | G06F 11/3604 717/126 |
| 2008/0222660 A1 | 9/2008 | Tavi et al. | |
| 2010/0131613 A1 | 5/2010 | Jonsson et al. | |
| 2010/0217944 A1 | 8/2010 | DeHaan et al. | |
| 2010/0235518 A1 | 9/2010 | Holden et al. | |
| 2011/0167067 A1 | 7/2011 | Muppirala | |
| 2012/0174067 A1 | 7/2012 | Locker et al. | |
| 2012/0278565 A1 | 11/2012 | Yamasaki et al. | |
| 2014/0143794 A1 | 5/2014 | Bryant-Rich et al. | |
| 2014/0250106 A1 | 9/2014 | Shapira et al. | |
| 2014/0266613 A1 | 9/2014 | Sehmer et al. | |
| 2014/0365912 A1* | 12/2014 | Shaw | G06F 3/04817 715/748 |
| 2015/0074194 A1* | 3/2015 | Schabes | H04L 51/32 709/204 |
| 2015/0193392 A1* | 7/2015 | Greenblatt | G06Q 10/109 715/205 |
| 2015/0381714 A1* | 12/2015 | Hawkins | G06F 9/4843 715/739 |
| 2016/0171881 A1 | 6/2016 | Thompson et al. | |

OTHER PUBLICATIONS

"Learn How IFTTT Works," [online] IFTTT [retrieved Apr. 7, 2017], retrieved from the Internet: <https://www.ifttt.com>, 4 pg.

"Hub Keyboard, an app for Android and iOS," [online] The Garage, Microsoft © 2016 [retrieved Apr. 7, 2017], retrieved from the Internet: <https://www.microsoft.com/en-us/garage/project-details.aspx?project=hub-keyboard>, 4 pg.

"Gboard—a New Keyboard from Google," [online] Apple Inc. © 2016 [retrieved Apr. 7, 2017], retrieved from the Internet: <https://itunes.apple.com/us/app/gboard-a-new-keyboard-from-google/id1091700242?mt=8>, 2 pg.

"Chat with your Google Assistant in Google Allo," [online] Google, Inc. © 2017 [retrieved Apr. 7, 2017], retrieved from the Internet: <https://support.google.com/allo/answer/6385794?co=GENIE.Plafform%3DAndroid&hl=en>, 2 pg.

Rosenberg, S., "How to Build Bots for Messenger," [online] Facebook for Developers, Apr. 12, 2016 [retrieved Apr. 7, 2017], retrieved from the Internet: <https://developers.facebook.com/blog/post/2016/04/12/bots-for-messenger/>, 3 pg.

"Do More with Snapshot," [online] Bing blogs, Microsoft Corporation © 2016, Jun. 1, 2012 [retrieved Apr. 7, 2017], retrieved from the Internet: <https://blogs.bing.com/search/2012/06/01/do-more-with-snapshot>, 2 pg.

Hindy, J., "How to Use Google Now on Tap in Android Nougat," [online] Tom's Guide, Purch © 2017, Jan. 12, 2017 [retrieved Apr. 7, 2017], retrieved from the Internet: <http://www.tomsguide.com/us/now-on-tap-android-nougat, review-4130.html>, 5 pg.

WIPO Appln. PCT/KR2017/003884, Written Opinion, dated Jul. 18, 2017, 6 pg.

WIPO Appln. PCT/KR2017/003884, International Search Report, dated Jul. 18, 2017, 6 pg.

EP Application 17782631.0, European Extended Search Report, dated Feb. 27, 2019, 8 pg.

\* cited by examiner

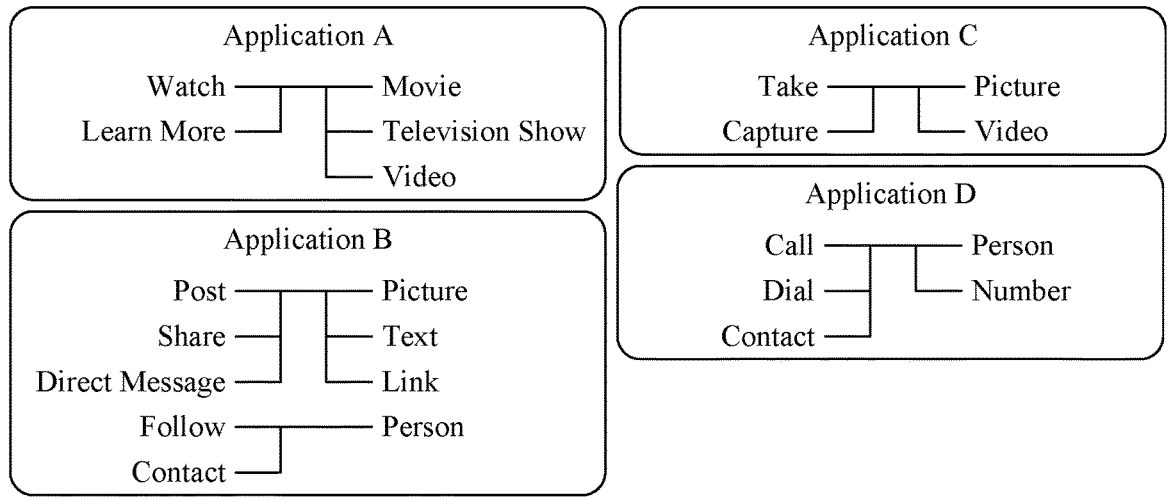
FIG. 5
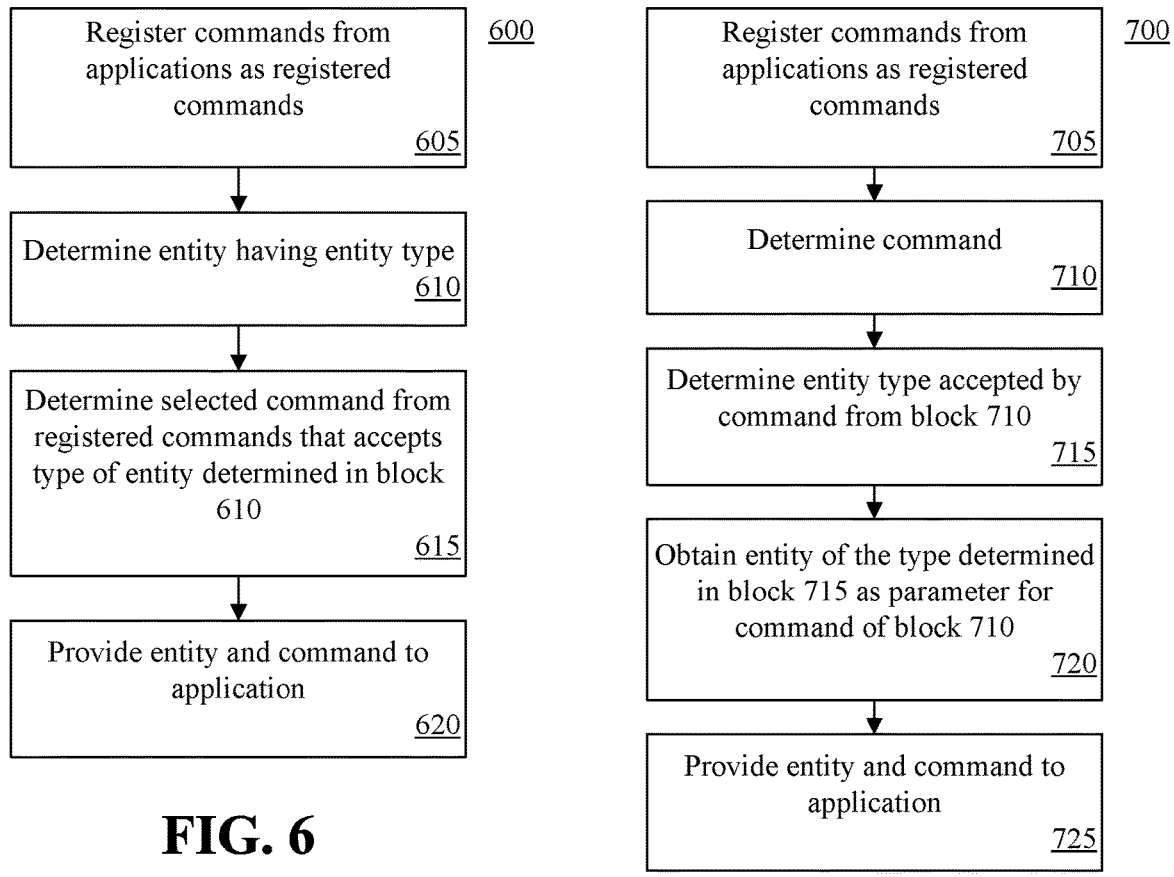
FIG. 6
FIG. 7

PLATFORM FOR INTERACTION VIA COMMANDS AND ENTITIES

CROSS-REFERENCE TO RELATED APPLICATIONS

This application claims the benefit of U.S. Provisional Patent Application No. 62/320,911 filed on Apr. 11, 2016, which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to a platform that supports user interactions with a computing device via commands and entities.

BACKGROUND

User interaction with modern computing devices is largely application-focused. A user installs an application on the computing device. The application is capable of performing various tasks. Once installed, the user is able to interact with the application to accomplish those tasks. In the case of a computing device with a touchscreen, the dominant form of user interaction is often referred to as "find and tap." "Find and tap" refers to the scenario in which a user navigates through the graphical user interface (GUI) of the application to find needed controls and taps or otherwise selects the controls to initiate commands. Since many tasks require multiple steps to complete, a user often spends a substantial amount of time navigating the GUI of the application in order to accomplish the task at hand.

In many cases, users perform more complex tasks using multiple different applications and/or using multiple different devices. When applied across applications and/or devices, the "find and tap" methodology further increases the amount of time users spend navigating the GUIs of applications. In other cases, a user may have a general idea to engage in some activity at a later time without fully conceiving or defining the task to be performed. Capturing this intent is difficult given the dominance of find and tap interaction in modern computing devices which presumes that a task is fully conceived or completely defined from the start.

SUMMARY

One or more embodiments are directed to methods of interacting with a computing device. In one aspect, a method can include registering a plurality of commands from a plurality of applications, wherein the plurality of commands specify entity types that are accepted as parameters, determining a first entity having a first entity type, wherein the first entity is independent of the plurality of applications, determining a selected command from the plurality of commands registered by the plurality of applications that accepts the first entity type as a parameter, and providing, using a processor, the first entity and the selected command to a first application of the plurality of applications that supports the selected command for execution.

In another aspect, a method can include registering a plurality of commands from a plurality of applications. The method can include determining a first command, wherein the first command is one of the plurality of commands, determining a first entity type accepted by the first command based upon the registering, and obtaining a first entity of the first entity type as a parameter for the first command. The first command and the first entity can be provided to a first application of the plurality of applications that supports the first command using a processor.

One or more embodiments are directed to apparatuses. In one aspect, an apparatus includes a memory configured to store program code and a processor coupled to the memory, wherein the processor, in response to executing the program code, is configured to initiate operations for interacting with the apparatus. The operations can include registering a plurality of commands from a plurality of applications, wherein the plurality of commands specify entity types that are accepted as parameters, determining a first entity having a first entity type, wherein the first entity is independent of the plurality of applications, determining a selected command from the plurality of commands registered by the plurality of applications that accepts the first entity type as a parameter, and providing the first entity and the selected command to a first application of the plurality of applications that supports the selected command for execution.

One or more embodiments are directed to computer program products for interacting with a computing device. In one aspect, a computer program product includes a computer readable storage medium having program code stored thereon. The program code is executable by a processor to perform operations. The operations can include registering a plurality of commands from a plurality of applications, wherein the plurality of commands specify entity types that are accepted as parameters, determining a first entity having a first entity type, wherein the first entity is independent of the plurality of applications, determining a selected command from the plurality of commands registered by the plurality of applications that accepts the first entity type as a parameter, and providing the first entity and the selected command to a first application of the plurality of applications that supports the selected command for execution.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 5 illustrates another example of registering applications.

FIG. 6 illustrates an example method of interacting with a computing device using commands and entities.

FIG. 7 illustrates another example method of interacting with a computing device using commands and entities.

DETAILED DESCRIPTION

Figure 1:
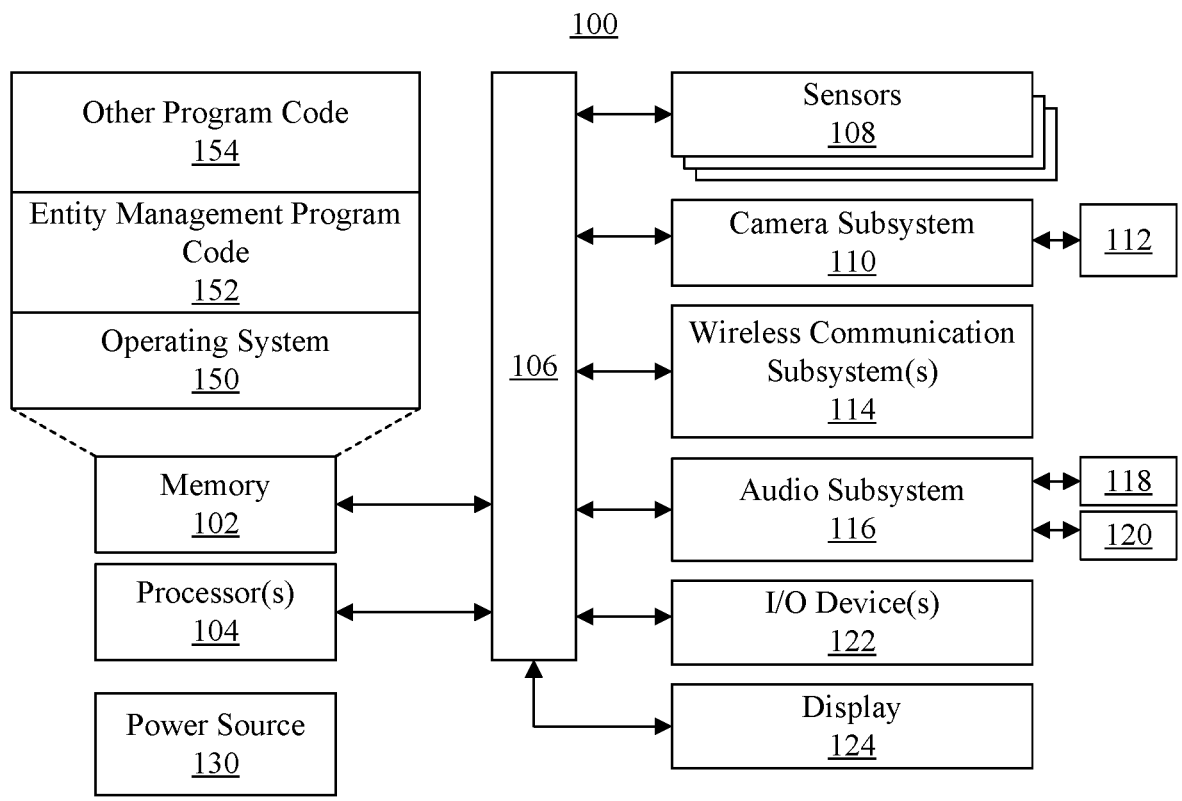
FIG. 1 illustrates an example computing device in accordance with one or more embodiments described within this disclosure.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to a platform that supports user interactions with a computing device via commands and entities. One or more embodiments described within this disclosure are directed to facilitating interactions between a user and a computing device (and/or system) by decoupling entities and/or commands from applications. In general, entities represent "things" that a user may wish to act on using the computing device or another system. Commands represent processes, methods, functions, tasks, etc., performed or executed by the computing device. The commands are available from different applications within the computing device or within another system and are able to operate on or use the entities.

An entity, a command, and/or a combination of one or more entities and one or more commands may be selected and executed. A selected entity and/or command may be executed without the user having to first launch or execute the application that supports the selected entities and/or commands. As such, the user need not determine the application that performs the desired command, launch the application, and then navigate through the graphical user interface (GUI) of the application to accomplish the desired task. In this regard, the entities exist within the computing device and can be persisted independently of applications.

In an embodiment, applications are able to register the different commands that each of the respective applications supports. Commands of the applications registered with the platform may be referred to herein as registered commands. The platform further enables applications to register as a provider of different entity types. Accordingly, workflows that involve multiple applications are supported as entities and/or commands may be obtained from one or more applications and provided to one or more other applications in order to perform the workflow. The workflows may further extend across a plurality of devices.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing device (device) 100 in accordance with one or more embodiments described within this disclosure. In the example of FIG. 1, device 100 includes a memory 102, one or more processors 104 (e.g., image processors, digital signal processors, data processors, etc.), and interface circuitry 106. In an aspect, memory 102, processor(s) 104, and/or interface circuitry 106 are implemented as separate components. In another aspect, memory 102, processor(s) 104, and/or interface circuitry 106 are integrated in one or more integrated circuits. The various components in device 100, for example, can be coupled by one or more communication buses or signal lines (e.g., interconnects and/or wires). In one aspect, memory 102 is coupled to interface circuitry 106 via a memory interface (not shown).

In the example shown, sensors 108, subsystems 110, 114, and/or 116, input/output (I/O) devices 122, and/or display 124 are coupled to interface circuitry 106 to facilitate the functions and/or operations described within this disclosure. Sensors 108, subsystems 110, 114, and 116, I/O devices 122, and/or display 124 may be coupled to interface circuitry 106 directly or through one or more intervening I/O controllers (not shown).

Examples of sensors 108 that may be included in device 100 can include, but are not limited to, a motion sensor, a light sensor, and/or a proximity sensor to facilitate orientation, lighting, and proximity functions, respectively, for device 100. Further examples of sensors 108 can include, but are not limited to, a location sensor (e.g., a GPS receiver and/or processor) to provide geo-positioning sensor data, an electronic magnetometer (e.g., an integrated circuit chip) to provide sensor data that can be used to determine the direction of magnetic North for purposes of directional navigation, an accelerometer to provide sensor data that can be used to determine change of speed and direction of movement of a device in 3-dimensions, and/or an altimeter (e.g., an integrated circuit) to provide sensor data that can be used to determine altitude.

Camera subsystem 110 is coupled to an optical sensor 112. Optical sensor 112 may be implemented using any of a variety of technologies. Examples of optical sensor 112 can include, but are not limited to, a charged coupled device (CCD), a complementary metal-oxide semiconductor (CMOS) optical sensor, etc. Camera subsystem 110 and optical sensor 112 can be used to facilitate camera functions, such as recording images and/or video clips.

Communication functions can be facilitated through one or more wireless communication subsystems 114. Examples of wireless communication subsystems 114 can include, but are not limited to, radio frequency receivers and transmitters, optical (e.g., infrared) receivers and transmitters, and so forth. The specific design and implementation of wireless communication subsystem 114 can depend on the particular type of device 100 implemented and/or the communication network(s) over which device 100 is intended to operate.

For purposes of illustration, wireless communication subsystem(s) 114 may be designed to operate over one or more mobile networks (e.g., GSM, GPRS, EDGE), a WiFi network which may include a WiMax network, a short range wireless network or personal area network (e.g., a Bluetooth network), and/or any combination of the foregoing. Wireless communication subsystem(s) 114 can implement hosting protocols such that device 100 can be configured as a base station for other wireless devices.

Audio subsystem 116 can be coupled to a speaker 118 and a microphone 120 to facilitate voice-enabled functions, such as voice recognition, voice replication, digital recording, and telephony functions. Audio subsystem 116 is capable of generating audio type sensor data.

Examples of I/O devices 122 can include, but are not limited to, track pads, keyboards, pointing devices, communication ports (e.g., USB ports, Ethernet ports, etc.), network adapters (e.g., modems, etc.), buttons or other physical controls, and so forth. Display 124 may be a screen, a touch sensitive screen, etc. It should be appreciated that a touch sensitive device such as a display and/or a pad is configured to detect contact, movement, breaks in contact, etc., (referred to herein as "gestures") using any of a variety of touch sensitivity technologies. Example touch sensitive technologies include, but are not limited to, capacitive, resistive, infrared, and surface acoustic wave technologies, other proximity sensor arrays or other elements for determining one or more points of contact with a touch sensitive device, etc. One or more of I/O devices 122 and/or display 124 may be adapted to control functions of sensors 108, and/or subsystems 110, 114, and/or 116 of device 100.

Device 100 further includes a power source 130. Power source 130 is capable of providing electrical power to the various elements of device 100. In an embodiment, power source 130 is implemented as one or more batteries. The batteries may be implemented using any of a variety of different battery technologies whether disposable (e.g., replaceable) or rechargeable. In another embodiment, power source 130 is configured to obtain electrical power from an external source and provide power (e.g., DC power) to the elements of device 100. In the case of a rechargeable battery, power source 130 further may include circuitry that is capable of charging the battery or batteries when coupled to an external power source.

Memory 102 can include volatile memory and/or non-volatile memory. An example of volatile memory is random access memory. Examples of non-volatile memory can include, but are not limited to, one or more magnetic disk storage devices, one or more optical storage devices, flash memory, etc. Memory 102 can store program code such as operating system 150, entity management program code 152, and other program code 154. Operating system 150 may be any of a variety of different operating systems including a mobile device operating system, an embedded operating system, etc. Operating system 150 may include instructions for handling system services and for performing hardware dependent tasks.

Entity management program code 152, upon execution, performs storage, management, and/or handling of entities and/or commands as described within this disclosure. Entity management program code 152 is capable of registering applications as providers of entities, registering commands of applications as registered commands, and querying applications for the availability of commands, entities, etc. Further aspects of entity management program code 152 are described in greater detail with reference to the remaining figures.

Memory 102 may also store other program code 154. Examples of other program code 154 may include instructions that facilitate communicating with one or more additional devices, one or more computers and/or one or more servers; GUI processing; sensor-related processing and functions; phone-related processes and functions; electronic-messaging related processes and functions; Web browsing-related processes and functions; media processing-related processes and functions; GPS and navigation-related processes and functions; security functions; camera-related processes and functions including Web camera and/or Web video functions; and so forth. As noted, other program code 154 may include one or more applications such as the various applications described herein that are providers of entities, applications that register commands, applications queried by entity management program code 152, etc. Memory 102 may also store various types of data (not shown) such as sensor data and so forth.

The various types of instructions and/or program code described are provided for purposes of illustration and not limitation. The program code may be implemented as separate software programs, procedures, or modules. Memory 102 can include additional instructions or fewer instructions. Furthermore, various functions of device 100 may be implemented in hardware and/or in software. For example, one or more functions of device 100 may be implemented as one or more signal processing and/or application specific integrated circuits.

Program code stored within memory 102 and any data used, generated, and/or operated upon by device 100 are functional data structures that impart functionality when employed as part of the device and/or another system. Further examples of functional data structures include, but are not limited to, entities, commands, workflows, application registration data, and so forth.

In an embodiment, one or more of the various sensors and/or subsystems described with reference to device 100 may be separate devices that are coupled or communicatively linked to device 100 through wired or wireless connections. For example, one or more or all of the various sensors 108 described in connection with FIG. 1 may be implemented as separate systems or subsystems that couple to device 100 by way of I/O devices 122 and/or wireless communication subsystem(s) 114.

Device 100 may include fewer components than shown or additional components not illustrated in FIG. 1 depending upon the particular type of device that is implemented. In addition, the particular operating system and/or application(s) and/or other program code included may also vary according to system type. Further, one or more of the illustrative components may be incorporated into, or otherwise form a portion of, another component. For example, a processor may include at least some memory.

Device 100 is provided for purposes of illustration and not limitation. An apparatus, device, and/or system configured to perform the operations described herein may have a different architecture than illustrated in FIG. 1. The architecture may be a simplified version of the architecture described in connection with device 100 and include a processor, memory storing instructions, and a display.

Example implementations of device 100 may include, but are not limited to, a smart phone or other mobile device or phone, a wearable computing device (e.g., smart watch, fitness tracker, etc.), a computer (e.g., desktop, laptop, tablet computer, other data processing system, etc.), and any suitable electronic device capable of performing the functions described herein. Furthermore, it will be appreciated that embodiments can be deployed as a standalone device or deployed as multiple devices in a distributed client-server networked system. In an embodiment, the system is implemented as two or more devices such as a first device (e.g., a smart watch or fitness tracker) configured or paired to operate with a second device (e.g., a mobile phone, a tablet computer, computer system, etc.).

Figure 2:
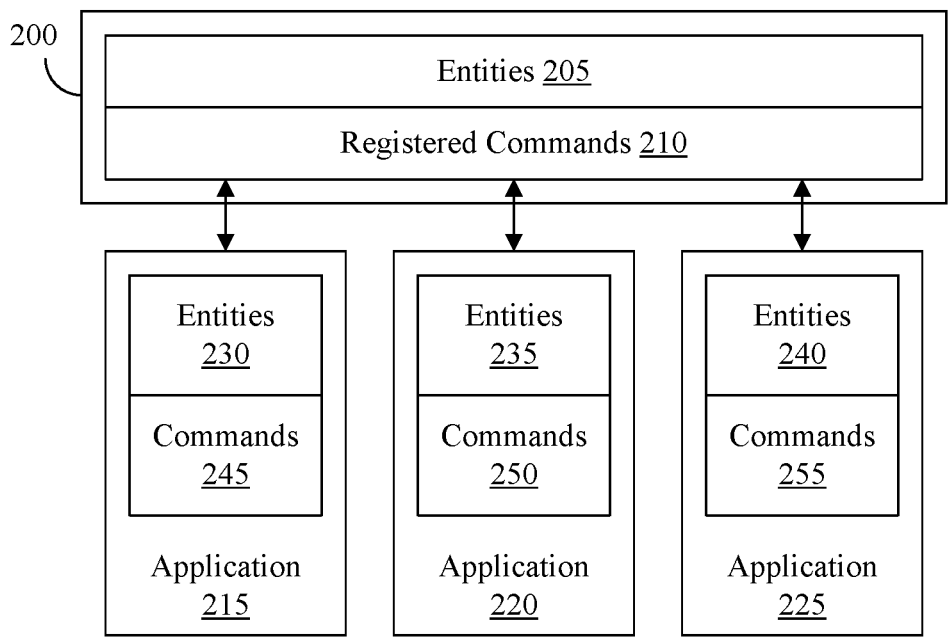
FIG. 2 illustrates an example of an interaction model supported by an entity management system (EMS).

FIG. 2 illustrates an example of an interaction model supported by an entity management system (EMS) 200. EMS 200 may be implemented by, or as, entity management program code 152 of FIG. 1. The interaction model of FIG. 2 illustrates that entities 205 and registered commands 210 exist independently of applications 215, 220, and 225. The term "entity" refers to a data structure that represents a noun or real world object that a computing device is capable of acting on. Each entity has a type such as "Person," "Place," or "Thing." Each entity further has one or more fields. For example, a person entity type may have a field for mobile phone number, a field for electronic mail address, etc. Other examples of entities include, but are not limited to, "Movie," "Restaurant," "Song," etc. A command represents a process, a method, a function, etc., performed by an application. A command takes, e.g., supports, one or more entities as parameters.

In an embodiment, EMS 200 may define and/or organize entities and/or commands based upon ontologies. In one example, the ontologies may be pre-defined as may be obtained from sources such as schema.org or other providers. In another example, the ontologies may be created specifically for EMS 200. In yet another example, EMS 200 is capable of allowing entity types and commands to emerge in an ad hoc fashion based on the commands and entity types declared by the applications that register with EMS 200. Other embodiments may use different combinations of these approaches.

In the example of FIG. 2, each of applications 215-225 is capable of supporting particular entities and/or commands. For example, application 215 supports entities 230 and commands 245. Application 220 supports entities 235 and commands 250. Application 225 supports entities 240 and commands 255.

In an embodiment, each of applications 215-225 is capable of registering with EMS 200. In general, registration includes an application registering as a provider of one or more different types of entities. For example, application 215 is capable of registering as a provider of different entity types corresponding to entities 230. Application 220 is capable of registering as a provider of different entity types corresponding to entities 235. Application 225 is capable of registering as a provider of different entity types corresponding to entities 240.

Registration also includes applications registering one or more commands supported, or executable, by the respective applications. For example, each of applications 215-225 is capable of registering one or more of the commands supported by the application with EMS 200. Application 215 is capable of registering one or more of commands 245 with EMS 200. Application 220 is capable of registering one or more of commands 250 with EMS 200. Application 225 is capable of registering one or more of commands 255 with EMS 200. The commands registered by the various applications 215-225 are shown as registered commands 210 within EMS 200. Further aspects of registration with EMS 200 are described herein in greater detail with reference to the remaining figures.

The interaction model illustrated in FIG. 2 shows that commands and entities are no longer constrained to residing solely within applications. In this regard, entities are referred to as being independent of applications as an entity may exist within EMS 200 and/or stored as a data structure independently or apart from an application that supports the entity. Each of applications 215-225 no longer functions solely as a self-contained application, but rather is capable of providing and/or consuming entities and providing support for performing commands that have been registered with EMS 200. EMS 200 is capable of invoking registered commands 210 within application 215, application 220, and/or application 225.

Figure 3:
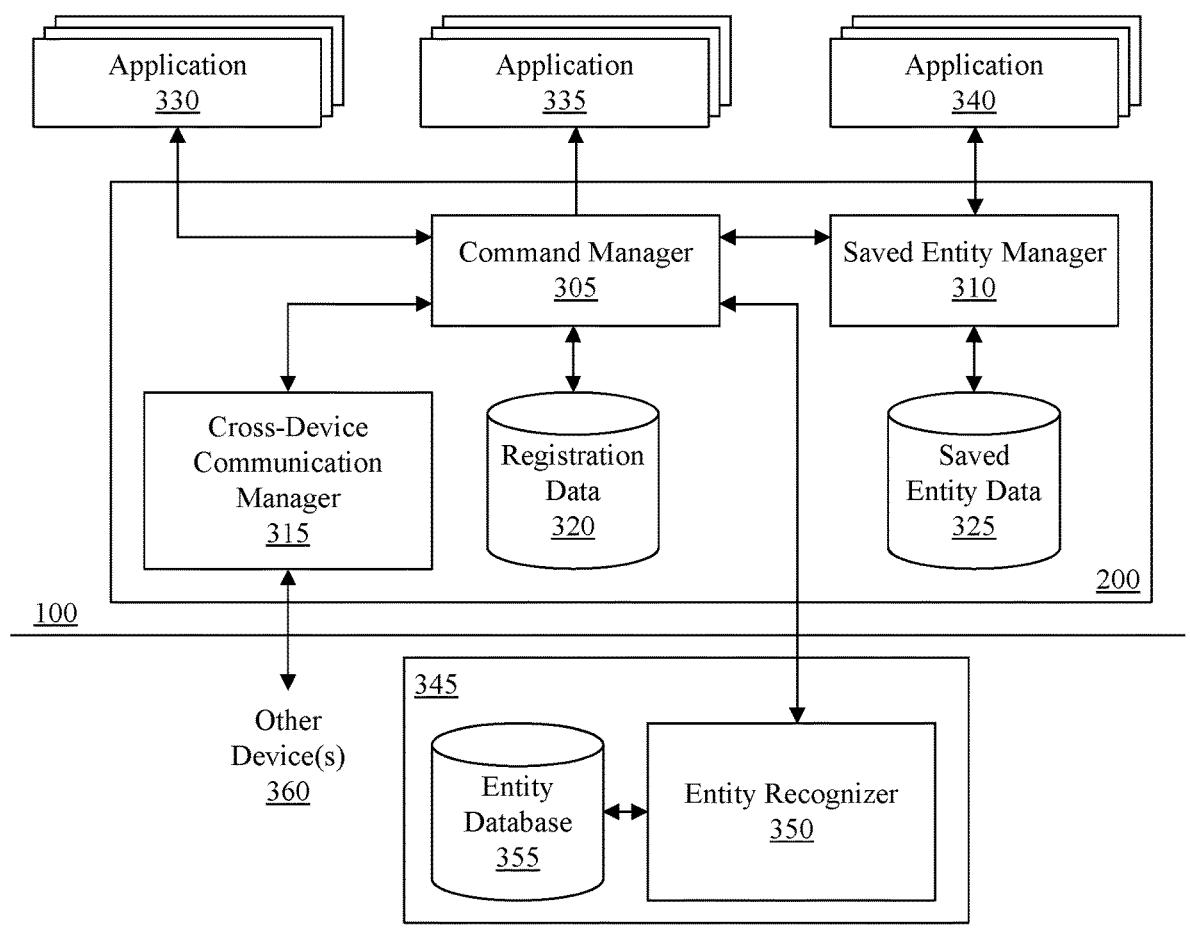
FIG. 3 illustrates an example architecture for the EMS.

FIG. 3 illustrates an example architecture for EMS 200. In an embodiment, EMS 200 is implemented as a part of the operating system (e.g., operating system 150) of device 100. For example, the various functions and the API described herein for EMS 200 may be an integrated part of the operating system and, as such, an integrated part of device 100.

EMS 200 and applications 330, 335, and 340 execute locally within device 100. In the example of FIG. 3, EMS 200 includes a command manager 305, a saved entity manager 310, and a cross-device communication manager (CDC manager) 315. Further, EMS 200 stores registration data 320 and saved entity data 325 in memory. In general, command manager 305, saved entity manager 310, and CDC manager 315, taken collectively, provide an application programming interface (API) that is accessible by applications executed locally within device 100 and/or by applications executing in one or more other devices and/or systems to perform the functions described herein.

In an embodiment, command manager 305 is capable of performing functions including, but not limited to, registering applications, querying applications, and providing entities and/or registered commands to applications. In the example of FIG. 3, command manager 305 is capable of registering applications such as application 330 and storing the data from the registration process as registration data 320. Command manager 305 is capable of querying applications such as application 330, e.g., in real time, to determine commands supported by application 330, entity types provided by application 330, and/or particular entities that match criteria provided in the query to application 330. Command manager 305 is also capable of providing combinations of registered commands and/or entities to applications such as application 335 for execution.

In an embodiment, saved entity manager 310 is capable of receiving entities from applications such as application 340 and storing the entities as saved entity data 325. Save entity manager 310 is also capable of providing saved entities from saved entity data 325 to applications such as application 340 in response to a request for a saved entity or a list of saved entities. In an aspect, a saved entity within saved entity data 325 may be stored in association with one or more registered commands and/or one or more candidate applications for acting on the saved entity.

In an embodiment, CDC manager 315 is capable of interacting with command manager 305 to serve as an interface for applications executing in one or more other devices 360 to register with EMS 200 (e.g., commands and/or entities provided by the applications), to save and/or retrieve entities via saved entity manager 310, and/or to send/receive commands and entities for execution to other devices 360.

In an embodiment, command manager 305 is capable of accessing an entity recognition service 345. For example, command manager 305 is capable of passing portions of text obtained from one or more applications to entity recognition service 345 for processing. Entity recognition service 345 recognizes entities within the received text and provides the recognized entities back to command manager 305.

In the example of FIG. 3, entity recognition service 345 is executed in a system that is different from device 100. For example, entity recognition service 345 may be implemented within a device and/or system that is remotely located from device 100. In an example, entity recognition service 345 is implemented as a Web-based or Internet-based service. In another embodiment, entity recognition service 345 is included and executed locally within device 100. In still another embodiment, entity recognition service 345 may be implemented partially on or within device 100 and partially in a separate or different data processing system than device 100.

Entity recognition service 345 can include a named entity recognizer 350 and an entity database 355. Named entity recognizer 350 is capable of recognizing entity names that occur within a text string as provided from command manager 305. Entity database 355 includes a listing or directory of candidate entities. In an embodiment, named entity recognizer 350 is capable of locating named entities within text that match, or correspond to, the candidate entities stored in entity database 355. Entity recognition service 345 is capable of providing the named entities recognized within the received text string to command manager 305. Command manager 305 is capable of receiving the results from entity recognition service 345 and using the received named entity or entities for further processing as described herein. In this manner, command manager 305 is capable of detecting entities from text or any of a variety of other data sources such as, for example, images.

Figure 4:
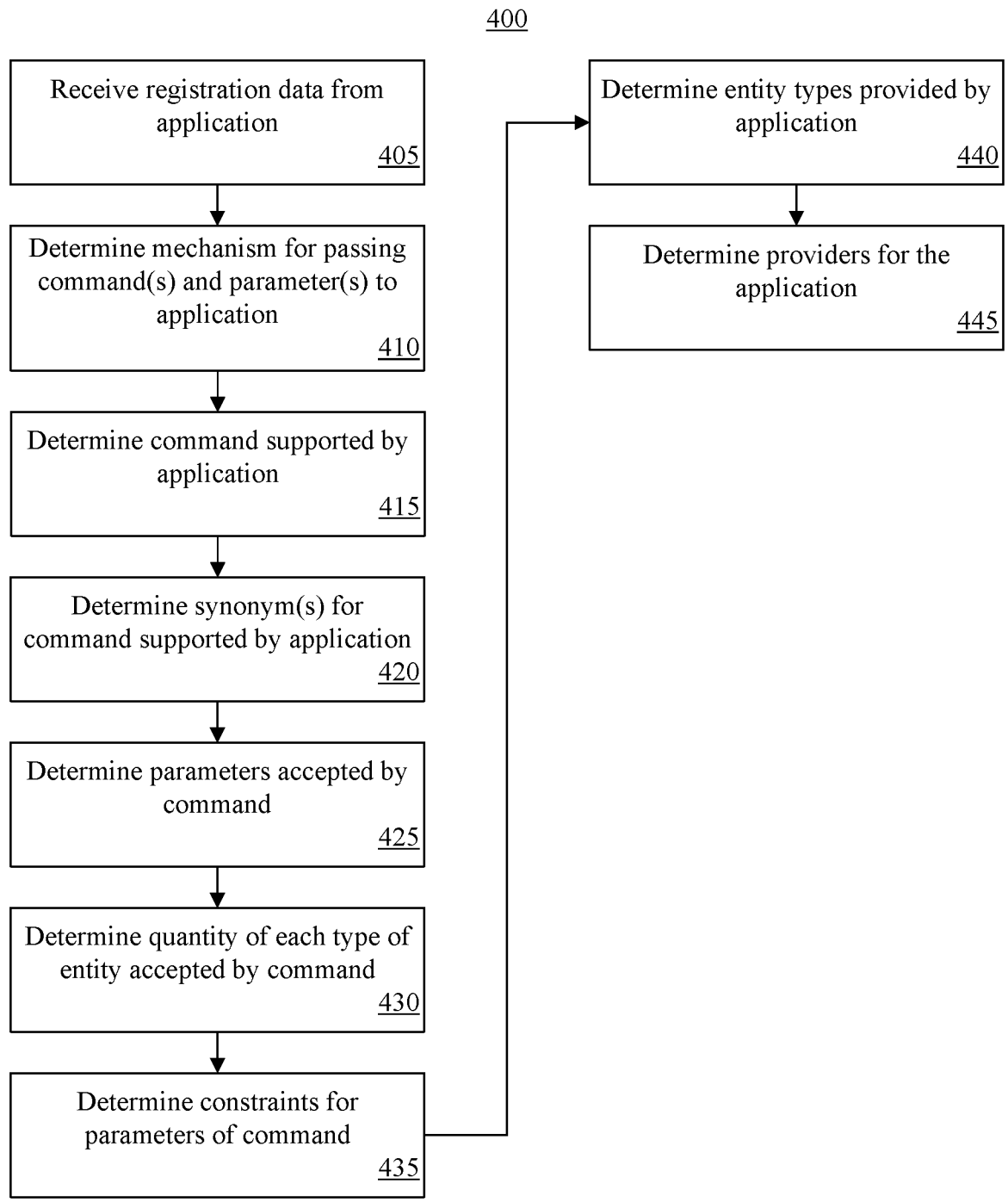
FIG. 4 illustrates an example method of registering an application.

FIG. 4 illustrates an example method 400 of registering an application. Method 400 is performed by EMS 200, as executed by device 100. Throughout this disclosure, reference is made to operations performed by EMS 200. It should be appreciated that such references refer to device 100, or another device and/or system similar thereto, executing EMS 200 or another platform similar thereto. In an embodiment, method 400 is performed by command manager 305 described in connection with FIG. 3.

In block 405, the EMS receives registration data from an application. For example, an application, using the API provided by the command manager, submits, or pushes, registration data. The registration data may be specified in any of a variety of formats and/or syntax. In one example, the registration data is specified using a markup language such as Extensible Markup Language. In another example, registration data is submitted as a delimited text file, or the like. For purposes of discussion, method 400 describes an example where the registration data specifies one command for the application. It should be appreciated, however, that the registration data provided by an application may specify more than one command supported by the application. Accordingly, the processing described in connection with FIG. 4 may be applied to process additional commands within the registration data as needed. In any case, the EMS is capable of parsing the received registration data in performing the various operations described below.

In another example, the EMS is capable of pulling in registration data for an application rather than the application actively registering with the EMS. The operating system of device 100, as part of installing the application, may store registration data for the application in a canonical location. The EMS is capable of detecting installation of the new application, for example, via a review of the registration data stored in the canonical location. The EMS is further capable of looking for data associated with the application in the canonical location that contains the registration data for the application and importing the registration data.

In block 410, the EMS determines a mechanism for passing command(s) and parameter(s) to the application from the registration data. In an embodiment, the registration data specifies a package and a class for passing commands and parameters to the application.

In block 415, the EMS determines a command that is supported by the application from the registration data. In an aspect, the EMS, in determining the command supported by the application from the registration data, stores a record of the application and the supported command as a "registered command" for the application within the command and provider data described in connection with FIG. 3.

In block 420, the EMS determines one or more synonyms for the command from the registration data if specified. Specifying synonyms for a command is optional and, as such, registration data may or may not include synonym(s) for the command. As an illustrative example, the application providing registration data may be an electronic mail application. The registration data may indicate that the "Email" command is a supported command, e.g., a command that is executable by the application to create an electronic mail and send the electronic mail. The registration data may specify that "Send" is a synonym for the "Email" command. With reference to the electronic mail application, the terms "Send" and "Email" are considered the same command. The system is capable of adding the synonym(s) for the command to the appropriate record within the command and provider data.

In block 425, the EMS determines the parameters that are accepted by the command for the application from the registration data. In an embodiment, a parameter for a command specifies a label for the entity and an entity type. As an illustrative example, the label of an entity for the "Email" command may be "To," "CC," and/or "BCC." The label indicates how the parameter is used by the command. The entity type may be "person." Accordingly, the registration data may specify that the "email" command is capable of receiving an entity of the type "Person" for the "To" label, an entity of the type "Person" for the "CC" label, and an entity of the type "person" for the "BCC" label.

In block 430, the EMS determines the quantity of each type of entity that is accepted by the command from the registration data. For example, the registration data may specify that the "Email" command must receive one or more "Person" type entities for the "To" label and zero or more "Person" type entities for each of the "CC" and "BCC" labels. In this regard, the registration data further indicates whether a parameter is required or optional. For example, the parameter for the "To" label may be required, while parameters for the "CC" and "BCC" labels may be optional.

In block 435, the EMS determines constraints for parameters of the command from the registration data, if specified. A constraint indicates which fields of an entity are required for a given parameter of a command. Continuing with the "Email" command example, an example of a constraint may be that the parameter having the "To" label requires that the entity of type "Person" have an electronic mail address field, e.g., a value for the electronic mail address field. Otherwise, an entity provided in fulfillment of the parameter is unable to provide the needed information to execute the "Email" command.

In another example, a messaging application may support a command such as "Message" that has a synonym of "Send." In this example, the "Message" command may have a constraint that states that an entity of type "Person" must have a messaging address (e.g., an electronic mail address or the like) for messaging.

In block 440, the EMS determines the entity types provided by the application, if any, from the registration data. An application is capable serving as a provider of one or more different entity types. A contact management application, for example, may register as a provider of "Person" entity types. A streaming service may register as a provider of "Movie," "Television Show," or "Song" entity types. A photo management application may register as a provider of "Photo" and/or "Video" entity types.

In block 445, the EMS determines the providers for the application from the registration data. In an embodiment, the provider of an application is an entry point for the application that the EMS is capable of calling and that, when executed, allows the EMS to choose or specify an entity. The registration data can specify the entry point. In one aspect, the entry point of the application is an Activity, e.g., as available in the Android operating system. In another aspect, the entry point for an application is a service.

FIG. 5 illustrates another example of registering applications. In the example of FIG. 5, each of applications A, B, C, and D has registered with the EMS. Application A, for example, is a streaming media service. As pictured, application A supports commands such as "Watch" and "Learn More." Both of the "Watch" and "Learn More" commands accept entities of type "Movie," "Television Show," and "Video." Application B, for example, is a social networking application. Application B supports commands such as "Post," "Share," "Direct Message," "Follow," and "Contact." The commands "Post," "Share," and "Direct Message" are capable of receiving entity types of "Picture," "Text," and "Link." The commands "Follow" and "Contact" are capable of receiving entities of type "Person".

Application C, for example, is a camera application. Application C supports the commands "Take" and "Capture." The commands "Take" and "Capture" are capable of receiving entity types of "Picture" and "Video." Application D, for example, is a phone application. Application D supports the commands "Call," "Dial," and "Contact." Commands "Call," "Dial," and "Contact" are capable of receiving entity types of "Person" and "Number."

FIG. 6 illustrates an example method 600 of interacting with a computing device using commands and entities. Method 600 is performed by EMS 200. In an embodiment, method 600 is performed by command manager 305 described in connection with FIG. 3.

In block 605, the EMS registers commands from applications as registered commands. The system is capable of registering one or more commands from a plurality of different applications. The system is capable of registering commands as described in connection with FIGS. 3, 4, and 5.

In block 610, the EMS determines an entity having one of a plurality of entity types. In an embodiment, a user input is received that specifies, either directly or indirectly, a particular entity. In an example, the user may explicitly specify an entity. In another example, the user may provide user input specifying criteria. The EMS is capable of using the criteria, which may or may not include other commands and/or entities selected by the user, partially entered text, etc., to determine applications registered as providers of a particular type or types of entities. The EMS is capable of querying the determined application(s) using the criteria to obtain a candidate entity (or entities) that matches the criteria of the query.

In block 615, the EMS determines a selected command from the registered commands that accepts the entity type of the entity determined in block 610. In block 620, the EMS provides the selected command and the entity to an application. In an aspect, the system is capable of selecting the application from one or more different applications based upon further user inputs, default applications registered for the selected command, etc.

As an illustrative and non-limiting example, a user may wish to find a rating for a restaurant using an online review service, check reviews of a product prior to making an online purchase, or watch a movie on an online movie (e.g., streaming) service. Using a conventional find and tap interaction model where each application operates in a self-contained manner that is siloed off from other applications, the types of interactions a user may engage in are limited. In particular, the user must go to each individual dedicated application to obtain a review of a restaurant, use another application to check a product review, use another application to make an online purchase, and use another application to watch the movie. The user must launch each individual application, engage in the find and tap paradigm within that application to perform the task, and repeat across the different applications as needed.

In accordance with the example embodiments described herein, an application for restaurant reviews may support a command such as "Learn About" and indicate that the command accepts entities such as "Restaurant" and/or "Store" as parameters. An online retail application may register a command such as "Buy" for a variety of different entities relating to products sold by the application including "Movie." In another example, the online retail application may support a command such as "Rent" where the command accepts the "Movie" entity type as a parameter. An online streaming application may register a "Watch" command that supports entity types of "Movie" and "Television Show."

In accordance with the inventive arrangements described herein, a user is able to directly access the entities and/or commands of the application without first executing and navigating within the applications themselves. In an example, the user may utilize an interactive command line GUI through which the user is able gain direct access to the commands and entities.

In an embodiment, the EMS is capable of chaining two or more commands together. For example, the EMS is capable of submitting a command to a first application and, in response, receiving one or more entities from the application. In one example, the EMS queries the first application for entities of a particular type that match a defined criterion. The EMS is capable of identifying one or more additional commands, automatically, for the returned entity or entities.

For example, the EMS is capable of determining which registered commands accept entities of the type returned by the first application. The EMS is further capable of selecting the command(s) and submitting the selected command(s) with the returned entity or entities to a second application that supports the selected command(s). In one or more embodiments, the user may guide the process described above by selecting among different candidate commands and/or returned candidate entities if required.

FIG. 7 illustrates another example method 700 of interacting with a computing device using commands and entities. Method 700 is performed by EMS 200. In an embodiment, method 700 is performed by command manager 305 described in connection with FIG. 3.

In block 705, the EMS registers commands from applications as registered commands as described herein. The registration data generated via the registration process specifies information such as which of the plurality of applications support different ones of the plurality of commands and entity types accepted as parameters for the registered commands.

In block 710, the EMS determines a command. The command may be a user specified command that is one of the plurality of commands registered in block 705. In an embodiment, a user input is received that specifies a particular command. One or more commands may be displayed that the user may select or choose. In an example, the user may provide user input specifying criteria such as one or more characters that the EMS can used to filter the commands of the registration data to a subset of commands matching the criteria from which the user may then choose.

In an embodiment, in response to the user specifying a particular command, the EMS is capable of calling an application that supports the command to display a user interface. As an illustrative example, in response to a "Post" command, the EMS is capable of calling the application that supports the "Post" command to display a user interface through which the user may specify additional data such as entities as parameters for the "Post" command.

In block 715, the EMS determines an entity type that is accepted by the command of block 710 as a parameter. In block 720, the EMS obtains an entity of the type determined in block 715 as a parameter for the command of block 710. In an aspect, the EMS is capable of querying applications that are registered as providers of the entity type determined in block 715 for entities. The EMS further is capable of providing criteria as part of the query. For example, the user may specify one or more characters that may be used to filter entities. The characters can be provided to the application(s) as part of the query so that the applications return only those entities of the requested type that match the query criteria. For example, the application may return only "Person" entities that begin with the letter "c." In another example, the entity may be selected from a listing of saved entities as described in greater detail herein.

In block 725, the EMS provides the selected command and the entity to an application for execution. In an aspect, the system is capable of selecting the application from one or more different applications based upon further user inputs, default applications registered for the selected command, etc.

As an illustrative and non-limiting example, a user may wish to make a post to a social networking platform. The user may specify the "Post" command through a user interface of the EMS. After specifying the "Post" command, the EMS may cause the application that supports the "Post" command to display a user interface through which the user may specify an entity for the "Post" command. In another example, the user may specify the entity for the "Post" command by continuing to use the user interface of the EMS.

Figure 8:
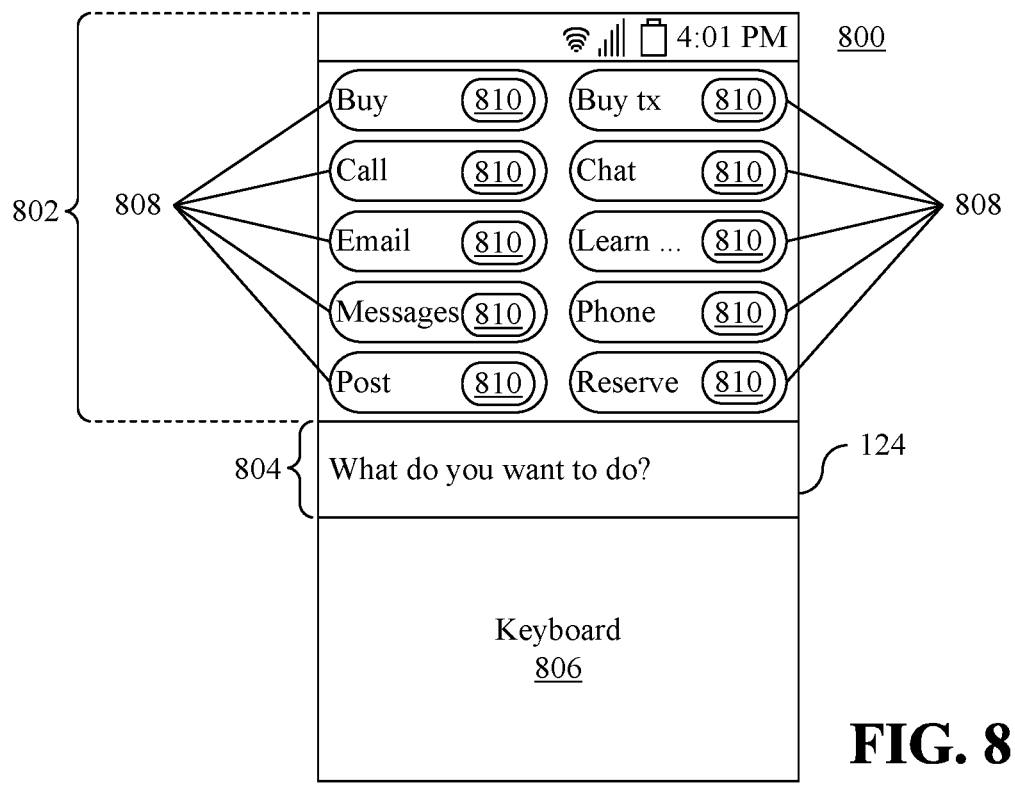
FIG. 8 illustrates an example of a graphical user interface (GUI) for use with one or more embodiments described herein.

FIG. 8 illustrates an example of a GUI 800 for use with one or more embodiments described herein. As pictured, GUI 800 is displayed by display 124 of device 100. In an embodiment, GUI 800 is a top-level interface that the EMS is capable of displaying in response to a particular user input requesting access to an interactive command line and/or to provide a command directly to an application. In this regard, GUI 800 is an example of an interactive command line.

Conventional command line interfaces receive text commands from users. These text commands execute applications. For example, each command, when submitted, executes a particular application. Further, conventional command lines are not interactive as is the case with FIG. 8. In the example of FIG. 8, GUI 800 is interactive as described in greater detail below. Further, GUI 800 is capable of receiving individual commands that execute or initiate individual operations or functions of an application as opposed simply initiating execution of the entire application itself.

GUI 800 includes region 802 and 804 and a keyboard 806. At least initially, region 802 is capable of displaying commands 808. A user is able to select one or more of commands 808 to issue to an application for execution. Commands 808 are for operations such as "Buy," "Call," "Email," "Messages," "Buy Tickets," "Chat," "Learn More," (e.g., shown as "Learn . . . "), and "Reserve."

Commands 808, or the controls representing such command, include icons 810. In an embodiment, icons 810 indicate the application that supports command 808. In an aspect, the link between an application and a command may be explicit or implicit. An application is explicitly linked to a command when the application is the only application that supports the command. An application is implicitly linked to a command when the command is supported by more than one application and the application is the default recipient of the command. Icons 810 may indicate whether the relationship between the command and the application is implicit or explicit.

In an embodiment, icons 810 are opaque when the relationship between commands 808 and the application is explicit. In that case, an icon 810 within a command 808 is the icon for the single application that supports the command. As such, icons 810, when opaque, indicate the particular application that will handle or perform commands 808. Icons 810 are translucent for those commands 808 that are supported by more than one application. A translucent icon 810 still may indicate a particular preferred application for the command. The translucency indicates that other applications also support the command and may be selected.

It should be appreciated that the particular visual effects used to indicate whether a single application or multiple applications support a command are provided for purposes of example and not limitation. Any of a variety of different visual effects may be applied to indicate the application(s) supporting the commands. In another example, the EMS is capable of showing all applications supporting a command as translucent icons associated with the selected commands and explicitly linked applications as opaque icons. In another example, the EMS is capable of labeling implicitly linked applications as "tentative" or "default."

The default application for a command may be selected using one or more different selection techniques. In an embodiment, the EMS is capable of selecting the default application for a command based upon frequency of use of the application to perform the command, where the application with the highest frequency is the default application. In an embodiment, the EMS is capable of selecting the default application for a command based upon recency of use where the application used most recently to perform the command is selected as the default application for the command. In an embodiment, the EMS is capable of selecting the default application based upon time stamp of installation, where the most recently installed application that supports the command is the default application for the command.

In an embodiment, an application, upon registering, is able to specify a default command for the application. In an example, if an application has a default command, GUI 800 is capable of showing applications together with the set of default commands for the applications. In an embodiment, region 802 is capable of displaying applications. The applications may be displayed with or without commands 808. In the case where the user selects an application from region 802 as opposed to a command 808, the EMS is capable of displaying the default command, e.g., a command 808, for the selected application within region 804. Further, the EMS indicates that the selected application is explicitly linked to the command using a visualization technique as described herein.

The EMS is capable of receiving a user input. For example, the EMS is capable of detecting a user touch or selection of a command 808 or user input using keyboard 806 specifying text within region 804. As the user provides input via GUI 800, the EMS is capable of filtering the set of choices presented in region 802. The filtered choices may be shown as updated commands 808 and/or entities. For example, as a user enters text into region 804, the EMS dynamically adjusts the set of commands 808 shown in region 802. The EMS is capable of continually adjusting the set of commands 808 and/or entities shown in region 802 as additional user input is received to display only commands 808 and/or entities that match the user specified text. The matching may be restricted to the beginning characters of the commands and/or applications supporting commands or to any portion of the commands and/or applications.

In an example, a user may select a desired command by tapping on the command to complete a text entry. In another example, the EMS is capable of displaying a candidate command as an auto-complete option for the user. The user may select the auto-complete option by pressing the space bar in keyboard 806. The auto-complete option provided by the EMS may be determined using any of a variety of different techniques. Examples of the techniques include, but are not limited to, choosing the first command from an alphabetically-sorted list of commands that starts with the user's textual input, choosing the command matching the user's specified text with the highest frequency, choosing the command matching the user's specified text with the most recent usage, etc.

When an application is explicitly linked to a command specified via GUI 800, the EMS only allows entry of a parameter (e.g., entity) or combination of parameters that the application allows for the command. When a link is implicit, e.g., two or more applications support the command specified via GUI 800, the EMS permits any parameter (e.g., entity) or combination of parameters that are accepted by at least one of the applications that support the command.

As the user continues to specify further entities through GUI 800, the link between a command and applications may transition from implicit to explicit as the EMS detects any entity or combination of entities that are allowed by only one of the applications that supports the specified command. In an example, GUI 800 may display a list of applications, e.g., in region 802, that support a command specified by the user. The command may be entered into region 804 using keyboard 806 or may be selected from region 802. The EMS is capable of receiving a user input selecting one of the listed applications thereby making the link between the command and the selected application explicit and restricting the set of allowable parameters that may then be received by the system.

Figure 9:
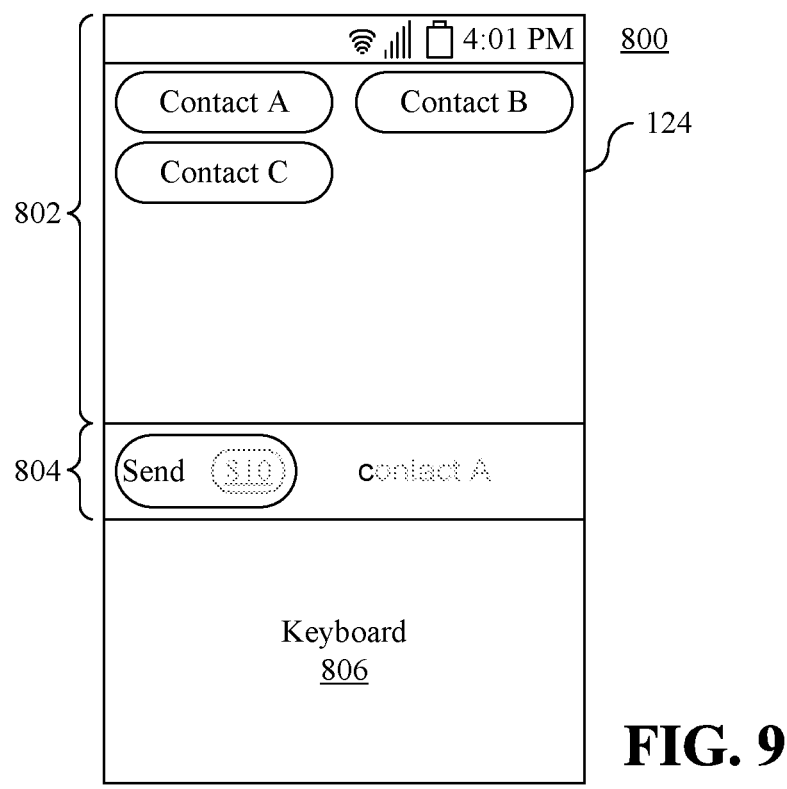
FIG. 9 illustrates another example of the GUI of FIG. 8.

FIG. 9 illustrates another example of GUI 800. In the example of FIG. 9, the EMS has changed the state of GUI 800 in response to the "Send" command being specified in region 804. Icon 810 for the "Send" command is translucent indicating that more than one application is registered to support the "Send" command. For example, the system may have two different electronic mail clients registered to support the "Send" command. Once a command has been selected, the user may specify parameters for the command. The system is capable of displaying candidate entities for the command.

For example, in response to the "Send" command being selected and the user pressing the letter "c" on keyboard 806, the EMS has filtered the set of allowable entities to those shown in region 802. In an embodiment, once the user selects a command from region 802, the EMS is capable of displaying only entities that may be accepted by the selected command as a parameter or as parameters. In an aspect, the user is unable to specify another command until the selected command in region 804 is completed or removed from region 804. In the example of FIG. 8, the EMS has determined that the "Send" command, for each of the supporting applications, accepts a "Person" type entity. Accordingly, the EMS queries applications registered to provide "Person" entities for entities that begin with the letter "c." As the user types in region 804 using keyboard 806, the EMS is capable of continuing to query applications for entities matching the entered text, e.g., character by character. The EMS, for example, sends the text received in region 804 to each of the applications registered to provide entities of the types that are allowable for the command in region 804. The EMS receives the candidate entities from the queried applications.

In response to receiving the candidate entities from the queried applications, the EMS lists the candidate entities in region 802 as selectable options. As pictured, the EMS displays 3 "Person" type entities (e.g., Contact A, Contact B, and Contact C) each starting with the letter "c." Within region 804, the auto-complete suggestion is for "Contact A," which the user may select at any time by pressing the space key of keyboard 806.

The EMS is capable of suggesting entities using any of a variety of different techniques. In one example, the EMS is capable of suggesting entities that are allowed for the command based upon frequency of selection of the entity for the command. In another example, the EMS is capable of displaying recently chosen entities for the command. In another example, the EMS is capable of suggesting entities in region 802 that the user frequently chooses or has recently chosen for a particular entity type across different commands.

In an embodiment, the EMS is capable of querying each application that is registered to provided entity types that are accepted by the command in region 804, e.g., the "Send" command. In another embodiment, the EMS is capable of querying a subset of the applications registered as providing entities of the type that are valid for the "Send" command. Limiting the number of applications queried facilitates faster processing speed. After limiting the set of applications that are queried and determining that a desired entity for the command has not been received, the EMS is capable of querying additional applications for entities. For example, after querying a subset of applications that provide "Person" entities and the user not selecting a candidate entity to complete the "Send" command or the queried applications not returning any candidate entities, the EMS expands the set of applications that are queried.

In an embodiment, the particular applications that the system queries for candidate entities may be restricted to only those that the user has enabled for providing candidate entities of the type allowed for the command in region 804. In such an embodiment, the user's privacy is better protected since only those applications that are specifically enabled by the user have access to the content (e.g., entities) acted on by the user. The EMS may provide a preference user interface through which a user may indicate which applications are allowed to provide entities of a particular type and/or provide entities of a particular type for different registered commands (e.g., on a per command basis).

In an embodiment, the system is capable of displaying available options for different user interfaces that applications make available through which a user is able to interactively choose an entity. As an illustrative example, a photo gallery application may provide a user interface through which a user is able to choose from recently taken pictures. The system is capable of displaying a control that initiates this interface along with controls for any other user interfaces provided by the gallery application to facilitate user selection of entities for commands.

Figure 10:
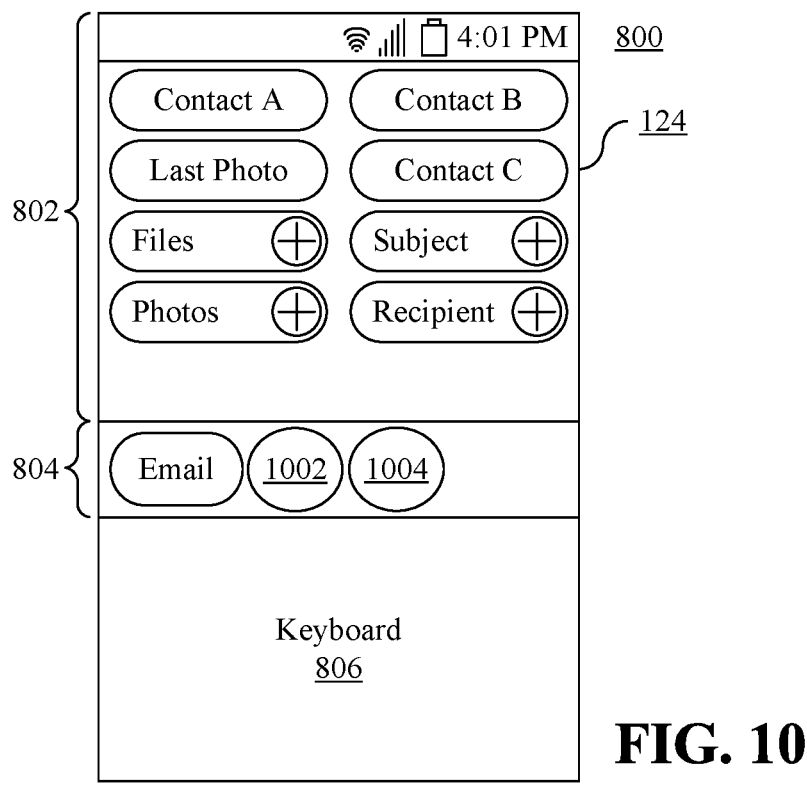
FIG. 10 illustrates another example of the GUI of FIG. 8.

FIG. 10 illustrates another example of GUI 800. In the example of FIG. 10, the EMS has changed the state of GUI 800 in response to the "Email" command being specified in region 804 along with entities 1002 and 1004. In the example of FIG. 10, the user has selected the "Email" command and allowable entities for the "Email" command. For example, entity 1002 may be a "File" type of entity specifying a particular file that may be attached to the electronic mail to be generated and sent while entity 1004 is a "Person" type of entity having an electronic mail address to be used for the "To" field of the electronic mail.

For purposes of illustration, the user may specify the "Email" command. The user may further specify descriptive input rather than literal names. For example, the user may select the "Last Photo" control in region 802 to initiate an entry point of a photo application to choose the last photo taken by device 100. The user further may type "Mom" to retrieve an entity of the type "Person" having a nickname of "Mom" and an electronic mail address.

The EMS adds, or attaches, entities 1002 and 1004 to the set of active parameters for the "Email" command. In the example of FIG. 10, entities 1002 and 1004 are illustrated as icons. It should be appreciated that entities may be represented in any of a variety of different forms including, but not limited to, text, a thumbnail image, icons, as both an icon or thumbnail and a title (e.g., text), etc. In an embodiment, the EMS is capable of displaying the label for the parameter that is received. Since entity 1004 has a type of "Person," the EMS may indicate that entity 1004 is for the "To" label for the "Email" command.

As discussed, the user is able to select entities 1002 and 1004 from a filtered set of entities shown in region 802 and/or by choosing an auto-complete option. Also, as discussed, the auto-complete option provided by the EMS may be determined in any of a variety of different ways. Because the applications may return candidate entities for display to the user in region 802 at different times, the EMS is capable of using different techniques for determining the auto-complete option at different times and/or for different applications based upon the type of entity that the application provides.

For example, the EMS is capable of determining an auto-complete option from a first set of candidate entities. The system is capable of waiting until each queried application returns candidate entities before choosing the auto-complete option. The system is capable of waiting a minimum amount of time from when each of the applications has been queried before choosing the auto-complete option. The system further is capable of choosing an auto-complete option, storing the auto-complete option, and updating the auto-complete option to a different candidate entity in response to determining that a better match has been determined or returned by a queried application.

The EMS allows the user to execute a command in region 804 at any time before or while selecting entities as long as the command is valid at the time of execution. A "valid" command is a command that has an entity as a parameter for each required parameter of the command. In the case of the "Email" command, for example, required entities may be a "Person" entity for the "To" command and optionally content such as an entity of a type such as "File," "Photo," etc., or text. Once a valid command is created, the user is able to initiate execution of the command through any of a variety of different techniques. In an example, the EMS submits the command (and any entities as parameters of the command from region 804) to the application that is explicitly or implicitly linked with the command in response to detecting activation of an "Execute" control that may be included in GUI 800, activation of a return or enter key, etc.

In an embodiment, in response to a user request to execute the command in region 804, the EMS is capable of bundling the selected entities as structured textual data and sending the structured textual data with the identity, e.g., an indicator, of the selected command to an application. The application is responsible for determining how to map the received data to the internal application format for executing the command. The application, for example, is capable of decoding the received data into an internal format used by the application.

The application receiving the data is also capable of choosing how to handle the command. In an embodiment, the application is capable of opening a particular user interface to display to the user. In another embodiment, the application is capable of executing the command in the background without showing an additional user interface to the user. For example, in the case of the "Email" command, the electronic mail application may create an electronic mail message directed to the electronic mail address specified by entity 1004, attach the file represented by entity 1002, and send the electronic mail message. In another example, the electronic mail application may create the electronic mail message and display the electronic mail message in an interface thereby allowing the user to make further changes to the electronic mail message prior to sending.

In some cases, two or more different applications are capable of returning entities that are the same. For example, a social networking application may return a "Person" type entity and a communication application may return a "Person" type entity, where the two entities correspond to the same person. In an embodiment, the EMS is capable of coalescing or combining entities determined to be the same entity. For example, the EMS is capable of comparing entity names and one or more fields of entities considered to be duplicates. In an aspect, in coalescing entities considered to be duplicates, the EMS is capable of combining fields in the event that one or more fields differ. For example, where two entities are for a same person but one entity includes a field for a social media credential and the other entity includes a field for an electronic mail address, the EMS coalesces the two entities into a single entity including a field for the social media credential and a field for the electronic mail address. The EMS can provide the coalesced entity as a parameter for a command.

In another embodiment, where the EMS is unable to definitively determine that two or more entities correspond to the same person or thing, the EMS is capable of clustering the similar entities. The EMS may present the clustered entities to the user and allow the user to select the correct or intended entity. In another example, the EMS is capable of presenting a coalesced entity and, in response to a particular user input, display the individual entities that were coalesced so that the user may select a particular one of the entities to use as a parameter for the command.

Figure 11:
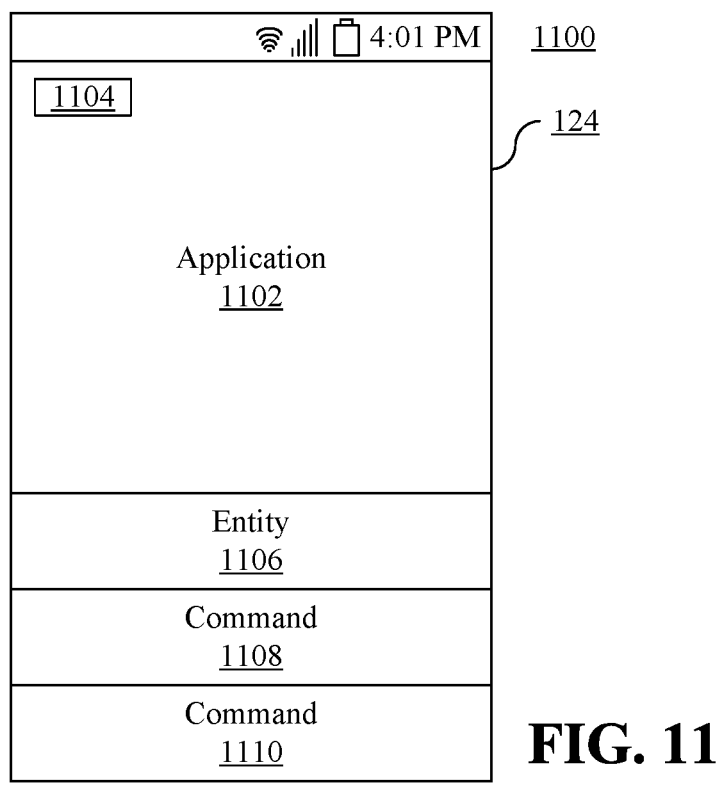
FIG. 11 illustrates another example of a GUI for use with one or more embodiments described herein.

FIG. 11 illustrates an example of a GUI 1100 for use with one or more embodiments described herein. GUI 1100 is displayed by display 124 of device 100 and illustrates usage of cross-application commands. Cross-application commands allow a user to transition activities across two or more different applications. In general, the user first selects an entity upon which the user desires to act.

In an embodiment, applications are capable of identifying an entity or entities from a current operating context of the application. For example, applications may provide a user interface element that, when selected, indicates that the user wishes to transition from the current application to a different activity. An application such as application 1102 in FIG. 11 may provide an icon 1104. Icon 1104 may be a common transition icon that application 1102 assigns to one or more interface controls to indicate contexts where application 1102 is able to provide an entity or entities to the EMS. Appreciably, application 1102 may only display icon 1104 in those contexts where application 1102 is able to provide entities.

In this regard, applications are capable of explicitly identifying an entity or entities relevant to the current context in response to a user input indicating a desire to transition activities. Accordingly, in response to a user selection of icon 1104, for example, application 1102 is capable of providing the EMS with descriptions of one or more entities determined for the current context of application 1102.

In an embodiment, the user may initiate a system-wide action that is recognized by the operating system as a request for entities relevant to the current operating context of the application currently executed and/or displayed. In an example, the system-wide action may be initiated in response to detecting that the home button of device 100 is held down or that a dedicated button on device 100 is activated. In that case, the operating system or the EMS as the case may be is capable of requesting entities from the displayed application.

As an illustrative example, application 1102 may be a movie database application. In response to a user request to transition activities, e.g., selection of icon 1104, application 1102 determines the content being displayed for the current context. Application 1102, for example, determines information for a particular movie is displayed on display 124 in the current view in GUI 1100 and provides the EMS with a description of the movie as a "Movie" type entity.

In another embodiment, the EMS is capable of recognizing named entities displayed by an application in the case where the application does not provide explicit support for transitioning activities. For example, in response to a user input, e.g., a system-wide transition action, the EMS is capable of extracting text that is displayed by application 1102 and processing the text to identify any named entities contained therein. In cases where the number of named entities found exceeds a threshold number, the EMS is capable of allowing the user to specify a limited region, e.g., drawing a bounding box, to indicate the subset of text to be processed. For example, the EMS may allow the user to swipe across a portion of text where the text swiped across is processed to identify named entities to initiate a transition activity. In another example, the EMS is capable of providing a user interface through which the user is able to narrow or reduce the number of named entities after the EMS determines an initial set of named entities. In a further example, the EMS is capable of combining a subset of named entities found with a prior set of named entities.

Referring again to FIG. 11, entity 1106 has been determined from the current context of application 1102. As discussed, in one example, application 1102 provides entity 1106 to the EMS. In another example, entity 1106 is determined from the context of application 1102 by the EMS. For example, application 1102 may be a browser displaying text of a Webpage. The EMS is capable of performing entity processing on the text of the Webpage to identify entity 1106 contained therein. For example, entity 1106 may be a book title mentioned in the Webpage.

The EMS is capable of identifying candidate commands 1108 and 1110 that can be initiated and receive entity 1106 based upon the registration data provided by the applications. In this example, the EMS has identified entity 1106 for the current context of application 1102 and displays entity 1106, e.g., a movie, and commands 1108 and 1110, e.g., "Buy" and "Rent" commands, respectively. Both the "Buy" and "Rent" commands allow a "Movie" type entity as a parameter. The example of FIG. 11 lists the detected entity and the available commands. In another example, the EMS is capable of displaying a list of applications with a control for each command that the application supports for the detected entity. Once the user selects a command for a particular application, the EMS is capable of sending the entity and the selected command to the application for execution.

Figure 12:
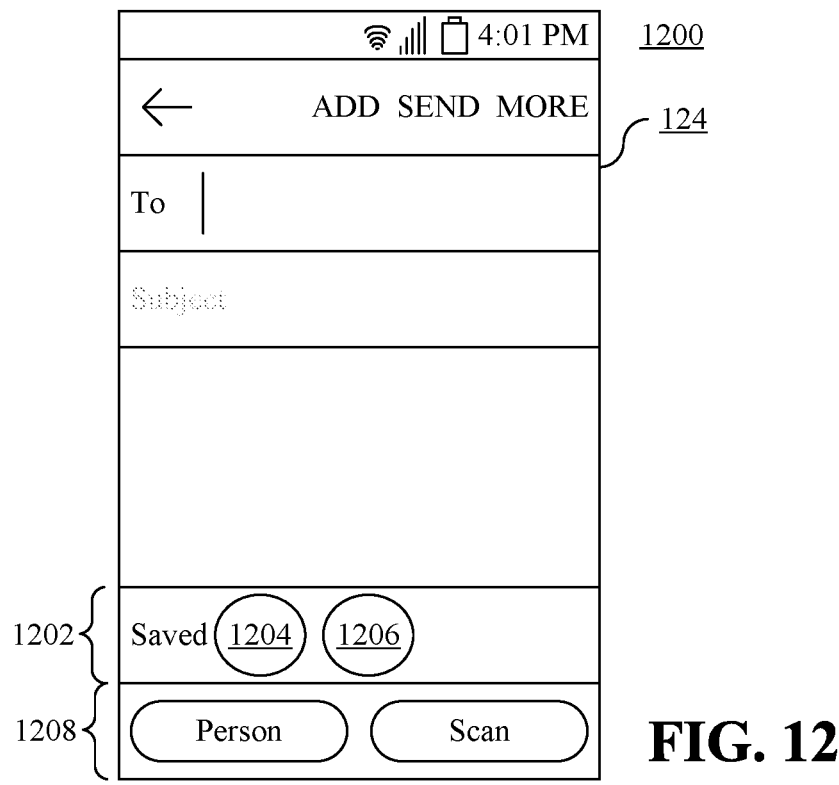
FIG. 12 illustrates another example GUI for use with one or more embodiments described herein.

FIG. 12 illustrates another example GUI 1200 for use with one or more embodiments described herein. GUI 1200 is displayed by display 124 of device 100 and illustrates an embodiment where users are able to select entities for applications. FIG. 12 illustrates an example where an application dynamically requests an entity, e.g., queries the EMS for entities.

In the example of FIG. 12, the application generating GUI 1200 is an electronic mail application. As pictured, the cursor is located in the "To" field of GUI 1200. In an embodiment, the application is capable of requesting a "Person" entity having an electronic mail address field in response to the cursor being located in the "To" field or another address field such as the "CC" or "BCC" fields. The email application requests a "Person" entity type from the EMS. The EMS, in response, is capable of providing one or more user interfaces that allows users to choose one or more entities of the desired type.

For example, the EMS is capable of generating region 1202 that allows the user to select from one or more entities 1204 and 1206 of the "Person" type. In one aspect, entities 1204 and 1206 are saved entities of the "Person" entity type.

In another aspect, entities 1204 and 1206 are obtained by the EMS in response to a query directed to registered providers of "Person" entities.

In another example, the EMS is capable of generating region 1208. Region 1208 allows the user to choose an "entity picker" user interface. In the example of FIG. 12, region 1208 includes controls for initiating a "Person" entity picker and a "Scan" entity picker. In response to activation of the "Person" entity picker, the EMS calls the provider registered by an application that is registered to provide "Person" entity types. In response to activation of the "Scan" entity picker, the EMS calls the provider registered by an application registered to provide "image" entity types that may be sent as attachment(s).

In another example, the EMS is capable of interactively suggesting entities as the user types in a field of GUI 1200 similar to the process described in connection with FIG. 8. When the user selects an entity or entities, the EMS provides the selected entity or entities to the current application in the appropriate field.

In an embodiment, an application is capable of providing a control that, upon activation, allows the user to choose an entity for the current context. Alternately, a system-wide control may be provided that allows the user to choose an entity for the current context. For example, upon detecting activation of the system-wide control, the EMS is capable of querying the application for the type of entity or entities that are valid for the current context (e.g., the type of entity that is allowed for the "To" field). The EMS is capable of providing a user interface configured to present entities of valid types that allows the user to select the entities for use in the current application. The particular user interface provided by the EMS can vary based upon the type of entities that are valid for the current context. Referring to FIG. 12, the user interface presented is one suitable for selecting from among entities of the "Person" entity type.

In some cases, the application may not accept entities. In such cases, the EMS is capable of displaying a user interface that allows the user to select any type of entity and, in response to a user selection of a particular entity, add a description of the selected entity to the current interface as text. For example, the EMS is capable of pasting a name and an address of a selected entity of the "Person" entity type or a particular restaurant of the "Restaurant" entity type into the body portion of the electronic mail that is being composed in FIG. 12.

Figure 13:
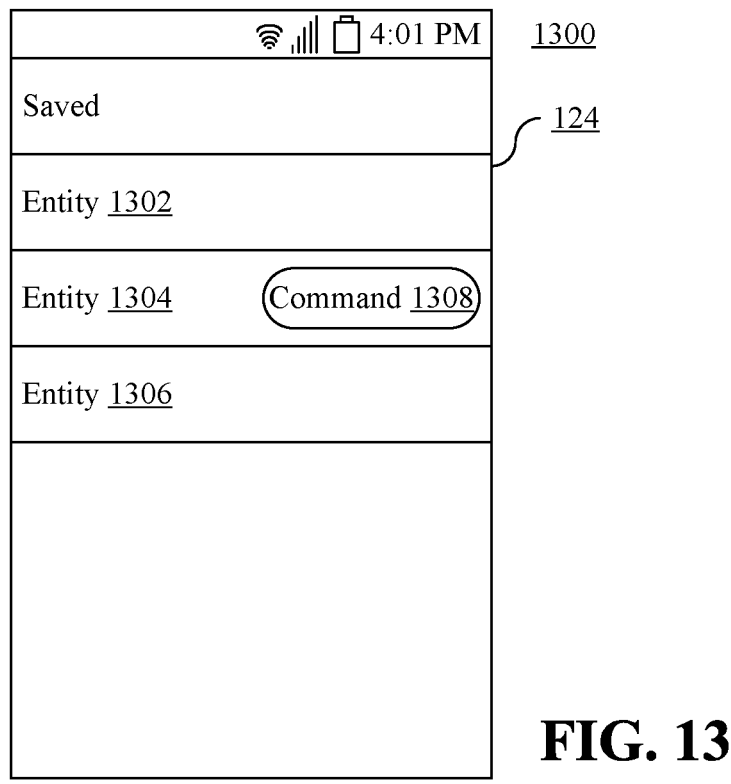
FIG. 13 illustrates another example GUI for use with one or more embodiments described herein.

FIG. 13 illustrates another example GUI 1300 for use with one or more embodiments described herein. GUI 1300 is displayed by display 124 of device 100 and illustrates an example of saving and subsequent recall of entities. In an embodiment, the EMS is capable of saving an entity selected by a user via one or more of the user interfaces described herein. For example, a control can be provided that, when activated, causes the EMS to save a designated entity for future action. The EMS, for example, is capable of saving the entity to a list of saved entities as described in connection with FIG. 3. In another example, the EMS is capable of saving commands and/or applications in combination with the saved entities. The EMS is capable of saving a command-entity pair or a command-entity-application triplet to the list.

In the example of FIG. 13, saved entities may be referred to as unexecuted entities as the entities that are saved have not yet been provided to an application in combination with a command. In an aspect, submission of an entity from the saved entity list (e.g., or saved entity data) indicates that the entity is executed and, as such, the EMS is capable of removing the saved entity from the saved entity list or saved entity data as the case may be.

In an embodiment, GUI 1300 is generated by the EMS. For example, the EMS is capable of providing a dedicated user interface through which a user is able to browse saved entities 1302, 1304, and 1306. If the entity is saved in combination with a command, the command may be displayed also. For example, saved entity 1204 is saved in combination with command 1308, which is shown and may be selected. Upon selection of command 1308, the EMS submits the saved entity and an indication of command 1308 to an application that supports command 1308 for execution. If the entity is saved in combination with a command and an application, the command and the application may also be displayed with the saved entity.

In an embodiment, a user is able to select a saved entity that is not saved in association with a command. For example, a user may select entity 1302 or entity 1306. In response to a user selection of a saved entity without a command saved therewith, the EMS is capable of presenting a list of available commands for the selected entity. In that case, the user is able to select one of the commands to execute. In response to a selection of a command, the EMS is capable of submitting the saved entity and an indication of the selected command to a handling application, e.g., an application that supports the selected command.

In an embodiment, applications are able to request access to saved entities. Further, the applications are able to request access to saved entities of a particular type. An application, with permission from the user, for example, is able to query the EMS for a list of saved entities and/or saved entities of a particular type. For example, an online shopping application may request saved entity types such as "Movies," "Books," "Music" or other types of entities that are available for purchase through the application. The EMS returns the list of saved entities matching the criteria specified by the application, e.g., specifying entity type, fields of the entities, etc. The application, in response to receiving the list of saved entities matching the specified criteria, is capable of searching for items available for sale through the application that match the saved entities. The application is capable of modifying the user interface presented to the user to show those saved entities that match items for sale thereby allowing the user to directly act on the saved entities.

Using a user interface such as GUI 1300, for example, saved entities may also be removed or deleted from the saved entity list. For example, a user may swipe a particular direction to remove entity 1302, 1304, and/or 1306 from the saved entity list.

In one or more embodiments, the EMS is capable of displaying saved entities as suggestions in various contexts. For example, the EMS is capable of displaying saved entities as candidate entities within region 802 as the user interacts with GUI 800 of FIG. 8. In another example, the EMS is capable of providing saved entities as candidates in response to a request from an application or in cases where the user expresses a desire to select an entity as described in connection with FIG. 12.

In an embodiment, the EMS is capable of saving the source application providing an entity. The EMS is capable of querying the source application from time-to-time, periodically, or responsive to an event such as a request for saved entities, to determine whether the saved entity is still valid. For example, a "Movie" type of saved entity may no longer be showing within theaters. As such, tickets for the movie are no longer available. Similarly, purchase of a movie and/or rental of the movie may not yet be available.

In that case, the EMS is capable of querying the source application of the "Movie" entity, or of "Movie" type entities, to determine whether the particular saved entity of the "Movie" type is still valid. In another example, a product may be discontinued. The EMS is capable of querying the source application for an entity representing a product to determine whether that entity is still valid, e.g., the product is still available for sale. In response to determining that an entity is no longer valid, the EMS is capable of removing or deleting the invalid entity from the list of saved entities.

Figure 14:
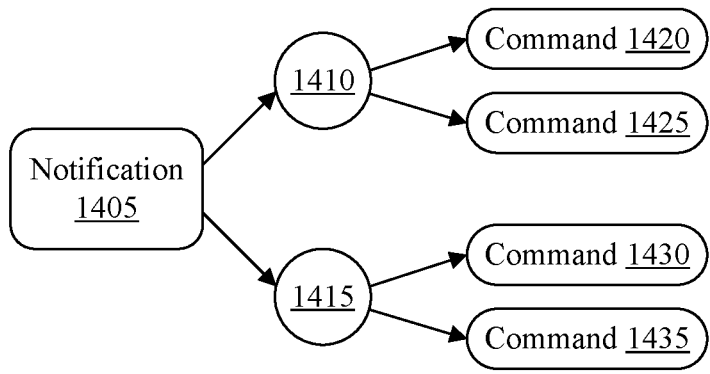
FIG. 14 illustrates an example of using entities with notifications.

FIG. 14 illustrates an example of using entities with notifications. In the example of FIG. 14, a notification 1405 is associated with one or more entities shown as entities 1410 and 1415. In an aspect, applications are capable of associating entities with notifications. In an embodiment, the EMS is capable of providing access methods to display entities associated with notifications and/or that allow the user to act on the entities associated with the notifications.

The EMS, in response to detecting an interaction (e.g., a user input such as a gesture) requesting a list of entities associated with a notification, is capable of displaying the entities associated with the notification. For example, a user may provide an input such as a gesture such as a long press on notification 1405. In another example, the user input may be a gesture such as a swipe of notification 1405 in one direction, e.g., to the left, to view entities 1410 and 1415. A swipe of notification 1405 in another direction, e.g., to the right, may dismiss notification 1405.

For example, in response to detecting a user interaction requesting the entities associated with notification 1405, the EMS is capable of displaying entities 1410 and 1415. Entities 1410 and 1415 are associated with notification 1405. For example, notification 1405 may be a notification indicating that a calendar event such as a dinner meeting is approaching. The calendar event may list a location of the meeting and an attendee. Accordingly, entity 1410 may represent the restaurant, e.g., the location, where the meeting is to take place. Entity 1415 may represent the attendee for the meeting. As illustrated, the EMS further may show commands and/or applications that are available for each entity. For example, the EMS may show commands 1420 and 1425 that act on entity 1410 or accept entity 1410 as a parameter. The EMS may show commands 1430 and 1435 that act on entity 1415 or accept entity 1415 as a parameter.

In an embodiment, the EMS is capable of saving notification 1405 as an entity in response to a different user input. For example, in response to a user input requesting to save notification 1405 as an entity, saved entity manager 310 is capable of creating an entity representing notification 1405 including any other entities associated with notification 1405 to the list of saved entities, e.g., to saved entity data 325.

Figure 15:
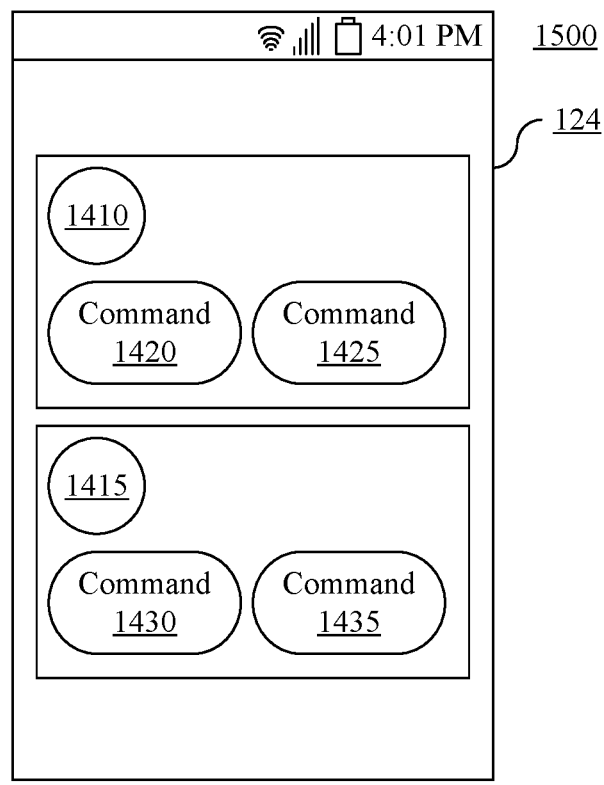
FIG. 15 illustrates another example GUI for use with one or more embodiments described herein.

FIG. 15 illustrates another example GUI 1500 for use with one or more embodiments described herein. GUI 1500 is displayed by display 124 of device 100 and illustrates an example where entities and/or commands associated with a notification are displayed. In the example of FIG. 15, the EMS detects a user interaction with the notification, where the user interaction is interpreted as a request for a list of the entities associated with notification 1405 of FIG. 14. In response, the EMS displays entity 1410 with the available commands 1420 and 1425. Further, the EMS displays entity 1415 with the available commands 1430 and 1435. Available commands 1420, 1425, 1430, and 1435 may be displayed as application icons, whether translucent or not, depending upon whether the commands pertain to one or more applications.

In an embodiment, entities associated with notifications may transition from one device to another device. For example, a notification such as notification 1405 may be displayed or presented on a second device that is associated or communicatively linked with device 100. The second device may be a peripheral device such as a wearable device. The second device is capable of displaying entities and/or actions of entities thereby allowing the user to act on the entities associated with the notification. The user is provided with shortcuts to initiate the commands to act on the entities through the second device.

Figure 16:
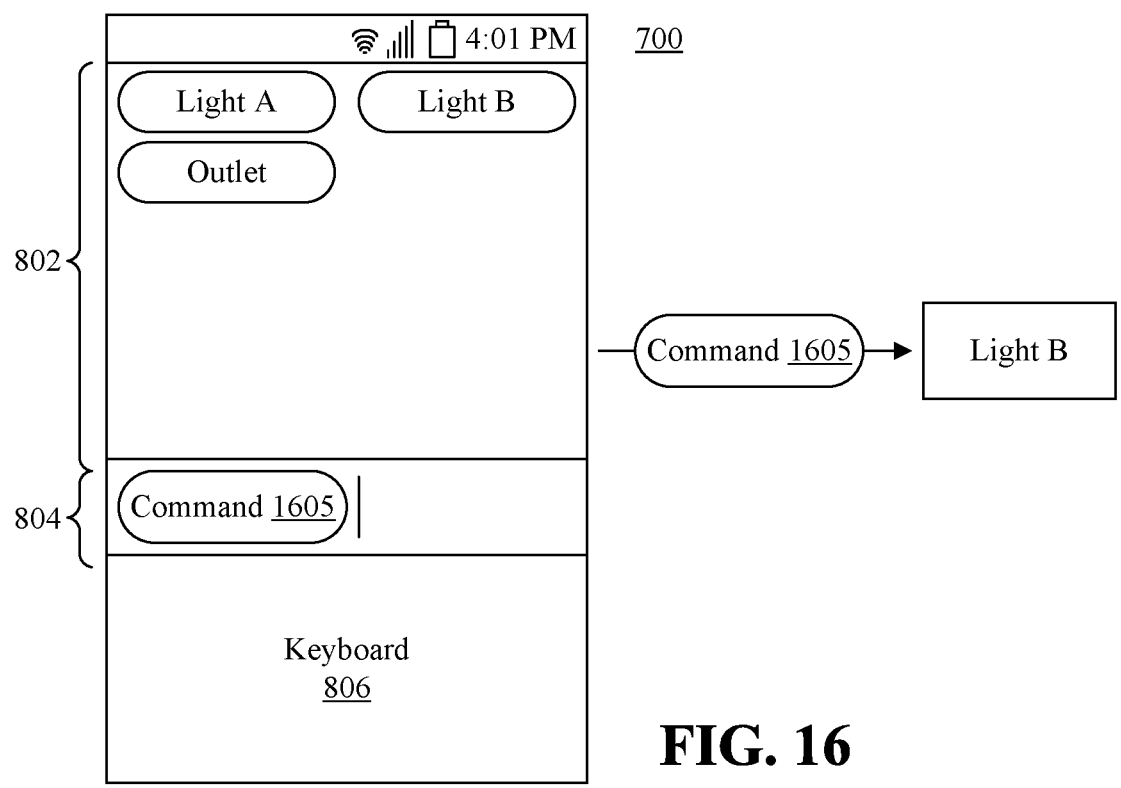
FIG. 16 illustrates the GUI of FIG. 8 and an example of cross-device interaction using entities and commands.

FIG. 16 illustrates GUI 800 and an example of cross-device interaction using entities and commands. In the example of FIG. 16, entities are utilized to represent different devices. As pictured, each of devices "Light A" (e.g., a network connected light), "Light B" (e.g., another network connected light), and "Outlet" (e.g., a network connected outlet) are shown in region 802 as a different entity. In an embodiment, device 100, using the EMS, is capable of issuing commands to these devices represented as entities.

In an embodiment, applications that are capable of controlling real world objects such as "Light A," "Light B," and "Outlet," etc., are capable of registering the commands that each such application uses to control the real-world object. Further, the applications may register as a provider of candidate entities representing the real-world objects controlled by each respective application. Thus, applications that are capable of controlling appliances, Internet of Things (IOT) devices, or the like are capable of providing candidate entities representing the real-world objects and commands for the real-world objects.

Referring again to FIG. 16, in response to a user input, GUI 800 is displayed and is configured for interacting with real-world objects. In this example, a command 1605 is entered in region 804. In an embodiment, command 1605 may include an icon representing the particular device and/or application to which command 1605 may be submitted. For example, if command 1605 is a "Turn On" command or a "Turn Off" command, command 1605 may be submitted to the application that controls "Light A," the application that controls "Light B," or the application that controls "Outlet." In cases where command 1605 can be submitted to more than one application or more than one device controlled by an application, the icon may be translucent. The user may explicitly select an entity to which command 1605 is to be submitted by tapping on the entity, typing the entity using keyboard 806, etc.

In response to a user input requesting execution, the EMS submits command 1605 to the appropriate application to control the real-world object represented by the selected entity. In this example, command 1605 is sent to the application that controls "Light B." "Light B" may be selected explicitly by the user, may be the default entity or device for command 1605, etc.

In another embodiment, the EMS is capable of communicating directly with an online IOT service to control real-world objects as opposed to interacting with a local application. For example, the EMS is capable of communicating with a Web or Internet service. In that case, the service is responsible for identifying the set of valid commands and entities available for use by the EMS.

In an embodiment, a similar technique is used to interact with applications that are related to, or utilize, particular accessory devices. Examples of accessory devices include, but are not limited to, headphones, wearable devices, speakers, vehicles, etc. In an example, the EMS is capable of detecting when an accessory device is connected or available to device 100. Each such accessory device may be associated with one or more applications. For example, a headphone accessory device may be associated with a music application. Accordingly, in response to detecting that the headphone accessory device is available or connected to device 100, the EMS is capable of displaying an interface that allows the user to send one or more of the available commands for the music application. As an illustrative example, the EMS is capable of displaying an interface that includes a "Play" command in response to detecting that the headphone accessory device is available. In response to a selection of the "Play" command, the EMS is capable of sending the "Play" command to the application to initiate playback of media.

In another aspect, as a user enters a command into region 804, the EMS is capable of suggesting an accessory device that is relevant to the entered command. Thus, if the user first specifies the "Play" command in the interactive command line, the EMS is capable of suggesting the use of a wireless speaker or headphones. The suggested accessory devices may be represented as entities in region 802 as previously described. As such, the user may select a suggested entity to include the accessory device in the command line as a parameter of a command. In response to execution of the command, the EMS is capable of actively attempting to connect to the selected accessory device and submitting the command to the application that supports the command.

As an illustrative example, consider the case where the command line includes the "Play" command and includes an entity representing a wireless speaker. In response to a user input requesting execution, the EMS is capable of actively attempting to connect to the wireless speaker represented by the entity if the wireless speaker is not already connected to device 100. Further, the EMS is capable of sending the "Play" command to the application that supports the "Play" command, whether explicitly selected, the default application, etc.

In another embodiment, the EMS is capable of facilitating communication across multiple, different devices. In some cases, a first device (e.g., a television) may support one or more commands on a second device (e.g., a receiver) and/or support commands on an application executing in the first device (e.g., a streaming service client). As an illustrative example, the EMS is capable of submitting, from device 100, an "On" command to a television, where the television is communicatively linked to device 100 and the "On" command is natively executable by the television. Further, the EMS is capable of sending a command to the television to tune the receiver to a particular channel or to play a particular movie. The television, upon receiving the command that is not natively executed, is capable of providing the command to the second device or application as the case may be (e.g., to the receiver to tune to a particular channel or to an application to stream a particular movie).

In another embodiment, the EMS is capable of supporting communications between different devices. In that case, device 100 is capable of acting as a bridge or liaison between two or more different devices. Device 100 is capable of introducing two or more different devices to one another and tracking the devices. For example, device 100 is capable of establishing peer-to-peer connections with two or more different devices. Using the peer-to-peer connections, device 100 is capable of sending commands to the other devices, retrieving data from a first device, and/or using the retrieved data from the first device to initiate a command on a second device.

The inventive arrangements described within this disclosure are not limited to using peer-to-peer connections. In another example, device 100 is capable of accessing an online service to route commands and/or data between other devices in lieu of peer-to-peer connections. In still another example, device 100 is capable of detecting other devices that are local or in close proximity to device 100 and identifying the devices in an ad hoc manner. Once identified, device 100 is capable of issuing commands to the devices.

Within the examples described, entities have been largely provided by different applications. In another embodiment, device 100 is capable of determining entities from real-world objects. Device 100 is capable of using a camera or other image capture system to obtain an image of a real-world object. Device 100 is capable of performing image processing on the captured image to determine an entity from the image.

For example, a user may capture an image using the camera of device 100. The image may be of a book, a poster for a movie, a restaurant, etc. Device 100 is capable of recognizing text in the image, performing object recognition on the image, etc. Data determined from text recognition and/or object recognition, e.g., text and/or a classification of the object per the ontologies that are used by device 100, may be used to query applications for entities matching the real-world objects recognized from the image.

In another example, the image may include a bar or QR code. In that case, device 100 is capable of retrieving information using the code. Device 100 is capable of querying applications for entities that match the information retrieved using the code.

In still another example, device 100 is capable of detecting real-world objects that are physically nearby, e.g., within a predetermined distance of the location of device 100. For example, device 100 is capable of identifying stores, restaurants, etc., that are nearby. In that case, device 100 is capable of providing or suggesting commands based upon the type of the recognized entities. Device 100 further is capable of storing such detected entities for use at a later time.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing.

Memory, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, and so forth.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems (e.g., devices), methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for interacting with a computing device, comprising:
    registering, using program code, a plurality of commands from a plurality of applications, the program code being separate from the plurality of applications, wherein the plurality of commands specify entity types that are accepted as parameters and wherein the program code and the plurality of applications are stored in the computing device;
    displaying a notification for a data object of a selected application of the plurality of applications on a screen of the computing device;
    in response to detecting a user input requesting a list of entities associated with the notification, determining a first entity having a first entity type, wherein the first entity is independent of the plurality of applications and is determined from an attribute of the notification;
    determining a selected command from the plurality of commands registered by the plurality of applications that acts on the first entity;
    displaying a graphical user interface including the first entity and the selected command on the screen of the computing device;
    in response to a user input selecting the selected command, providing, using a processor, the first entity and the selected command to a first application of the plurality of applications that supports the selected command for execution;
    wherein the first entity and the first entity type are determined by performing named entity processing on text displayed on the screen of the computing device to recognize a named entity within the text as the first entity; and
    wherein the determining the first entity includes providing the text to a named entity recognition service remote from the computing device, wherein the named entity recognition service performs the named entity processing and provides the named entity recognized from the text to the computing device.

2. The method of claim 1, further comprising:
    storing the first entity within a data storage device for subsequent recall; and
    displaying a list of saved entities including the first entity.

3. The method of claim 2, wherein the first entity is stored in association with at least one of the selected command or the first application.

4. The method of claim 1, further comprising:
    receiving a user input selecting a subset of the text, wherein the named entity processing is performed on the subset of the text.

5. The method of claim 4, wherein the user input draws a bounding box on the screen of the computing device selecting the subset of the text.

6. The method of claim 1, wherein the data object is a calendar event and the first entity is a location of the calendar event or an attendee of the calendar event.

7. The method of claim 1, wherein the data object is a calendar event, the first entity is a location of the calendar event, and a second entity specifying an attendee for the calendar event is determined from a further attribute of the calendar event; and
    wherein the graphical user interface further includes the second entity and a command registered by the plurality of applications that acts on the second entity.

8. An apparatus, comprising:
    a processor configured to initiate operations for interacting with the apparatus including:
    registering, using program code, a plurality of commands from a plurality of applications, the program code being separate from the plurality of applications, wherein the plurality of commands specify entity types that are accepted as parameters and wherein the program code and the plurality of applications are stored in the apparatus;
    displaying a notification for a data object of a selected application of the plurality of applications on a screen of the apparatus;
    in response to detecting a user input requesting a list of entities associated with the notification, determining a first entity having a first entity type, wherein the first entity is independent of the plurality of applications and is determined from an attribute of the notification;
    determining a selected command from the plurality of commands registered by the plurality of applications that acts on the first entity;
    displaying a graphical user interface including the first entity and the selected command on the screen of the apparatus;
    in response to a user input selecting the selected command, providing the first entity and the selected command to a first application of the plurality of applications that supports the selected command for execution;
    wherein the first entity and the first entity type are determined by performing named entity processing on text displayed on the screen of the apparatus to recognize a named entity within the text as the first entity; and
    wherein the determining the first entity includes providing the text to a named entity recognition service remote from the apparatus, wherein the named entity recognition service performs the named entity processing and provides the named entity recognized from the text to the apparatus.

9. The apparatus of claim 8, wherein the processor is configured to initiate operations further including:
    storing the first entity within a data storage device for subsequent recall; and
    displaying a list of saved entities including the first entity.

10. The apparatus of claim 9, wherein the first entity is stored in association with at least one of the selected command or the first application.

11. The apparatus of claim 8, wherein the processor is configured to initiate operations further including:
    receiving a user input selecting a subset of the text, wherein the named entity processing is performed on the subset of the text.

12. The apparatus of claim 11, wherein the user input draws a bounding box on the screen of the apparatus selecting the subset of the text.

13. The apparatus of claim 8, wherein the data object is a calendar event and the first entity is a location of the calendar event or an attendee of the calendar event.

14. The apparatus of claim 8, wherein the data object is a calendar event, the first entity is a location of the calendar event, and a second entity specifying an attendee for the calendar event is determined from a further attribute of the calendar event; and
    wherein the graphical user interface further includes the second entity and a command registered by the plurality of applications that acts on the second entity.

15. A computer program product comprising a computer readable storage medium having program code stored thereon for interacting with a computing device, the program code executable by a processor to perform operations comprising:
    registering, using the program code, a plurality of commands from a plurality of applications, the program code being separate from the plurality of applications, wherein the plurality of commands specify entity types that are accepted as parameters and wherein the program code and the plurality of applications are stored in a computing device;
    displaying a notification for a data object of a selected application of the plurality of applications on a screen of the computing device;
    in response to detecting a user input requesting a list of entities associated with the notification, determining a first entity having a first entity type, wherein the first entity is independent of the plurality of applications and is determined from an attribute of the notification;
    determining a selected command from the plurality of commands registered by the plurality of applications that acts on the first entity;
    displaying a graphical user interface including the first entity and the selected command on the screen of the computing device;
    in response to a user input selecting the selected command, providing the first entity and the selected command to a first application of the plurality of applications that supports the selected command for execution;
    wherein the first entity and the first entity type are determined by performing named entity processing on text displayed on the screen of the computing device to recognize a named entity within the text as the first entity; and
    wherein the determining the first entity includes providing the text to a named entity recognition service remote from the computing device, wherein the named entity recognition service performs the named entity processing and provides the named entity recognized from the text to the computing device.

16. The computer program product of claim 15, wherein the program code is executable by the processor to perform operations further including:
    storing the first entity within a data storage device for subsequent recall; and
    displaying a list of saved entities including the first entity.

17. The computer program product of claim 16, wherein the first entity is stored in association with at least one of the selected command or the first application.

18. The computer program product of claim 15, wherein the program code is executable by the processor to perform operations further including:
    receiving a user input selecting a subset of the text, wherein the named entity processing is performed on the subset of the text.

19. The computer program product of claim 18, wherein the user input draws a bounding box on the screen of the computing device selecting the subset of the text.

20. The computer program product of claim 15, wherein the data object is a calendar event and the first entity is a location of the calendar event or an attendee of the calendar event.

21. The computer program product of claim 15, wherein the data object is a calendar event, the first entity is a location of the calendar event, and a second entity specifying an attendee for the calendar event is determined from a further attribute of the calendar event; and
    wherein the graphical user interface further includes the second entity and a command registered by the plurality of applications that acts on the second entity.

* * * * *